(12) United States Patent
Yoshimoto et al.

(10) Patent No.: US 8,610,681 B2
(45) Date of Patent: Dec. 17, 2013

(54) INFORMATION PROCESSING APPARATUS AND INFORMATION PROCESSING METHOD

(75) Inventors: Masanori Yoshimoto, Minato-ku (JP); Hideaki Imai, Kanagawa (JP); Junichi Kosaka, Minato-ku (JP); Yoshihiro Mashiko, Minato-ku (JP); Hironobu Aoki, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 341 days.

(21) Appl. No.: 13/021,455

(22) Filed: Feb. 4, 2011

(65) Prior Publication Data
US 2011/0298732 A1    Dec. 8, 2011

Related U.S. Application Data

(60) Provisional application No. 61/350,955, filed on Jun. 3, 2010.

(51) Int. Cl.
*G06F 3/041* (2006.01)

(52) U.S. Cl.
USPC ......... 345/173; 345/419; 345/653; 178/18.03

(58) Field of Classification Search
USPC .................. 345/156–184, 419, 650, 653; 178/18.01–18.11
See application file for complete search history.

(56) References Cited

U.S. PATENT DOCUMENTS

| 7,515,143 | B2* | 4/2009 | Keam et al. | 345/175 |
|---|---|---|---|---|
| 2004/0233174 | A1* | 11/2004 | Robrecht et al. | 345/173 |
| 2006/0244733 | A1* | 11/2006 | Geaghan | 345/173 |
| 2006/0279548 | A1* | 12/2006 | Geaghan | 345/173 |
| 2008/0018618 | A1* | 1/2008 | Hill et al. | 345/177 |
| 2008/0168403 | A1* | 7/2008 | Westerman et al. | 715/863 |
| 2009/0277694 | A1* | 11/2009 | Hansen et al. | 178/18.03 |
| 2009/0277697 | A1* | 11/2009 | Bolt et al. | 178/19.01 |
| 2009/0322497 | A1* | 12/2009 | Ku et al. | 340/407.2 |
| 2010/0013799 | A1* | 1/2010 | Kim et al. | 345/177 |
| 2010/0058253 | A1* | 3/2010 | Son | 715/863 |
| 2010/0066696 | A1* | 3/2010 | Yang et al. | 345/173 |
| 2010/0182248 | A1* | 7/2010 | Chun | 345/173 |
| 2010/0214268 | A1* | 8/2010 | Huang et al. | 345/175 |
| 2010/0222110 | A1* | 9/2010 | Kim et al. | 455/566 |
| 2010/0245289 | A1* | 9/2010 | Svajda | 345/175 |
| 2010/0321309 | A1* | 12/2010 | Lee et al. | 345/173 |
| 2010/0323671 | A1* | 12/2010 | Jeong | 455/414.1 |
| 2011/0061006 | A1* | 3/2011 | Song et al. | 715/760 |

(Continued)

FOREIGN PATENT DOCUMENTS

JP    2009-522669    6/2009
WO   WO 2007/079425 A2    7/2007

*Primary Examiner* — Dmitriy Bolotin
(74) *Attorney, Agent, or Firm* — Oblon, Spivak, McClelland, Maier & Neustadt, L.L.P.

(57) ABSTRACT

An information processing apparatus including a display device; pointed position detecting means for detecting a specified position by a touch operation of a pointing device on a screen of the display device; sensor means for detecting a position of the pointing device when the pointing device is not in contact with the screen of the display device; and control means for recognizing the touch operation detected by the pointed position detecting means and controlling the information processing apparatus in accordance with the recognized touch operation and the position of the pointing device detected by the sensor means.

16 Claims, 14 Drawing Sheets

(56) References Cited

U.S. PATENT DOCUMENTS

| | | | |
|---|---|---|---|
| 2011/0122072 A1* | 5/2011 | Lin et al. | 345/173 |
| 2011/0148786 A1* | 6/2011 | Day et al. | 345/173 |
| 2011/0164029 A1* | 7/2011 | King et al. | 345/419 |
| 2011/0241988 A1* | 10/2011 | Bensler | 345/158 |
| 2011/0250928 A1* | 10/2011 | Schlub et al. | 455/550.1 |
| 2011/0267264 A1* | 11/2011 | McCarthy et al. | 345/157 |
| 2011/0310048 A1* | 12/2011 | B.R et al. | 345/173 |
| 2012/0019488 A1* | 1/2012 | McCarthy | 345/179 |

* cited by examiner

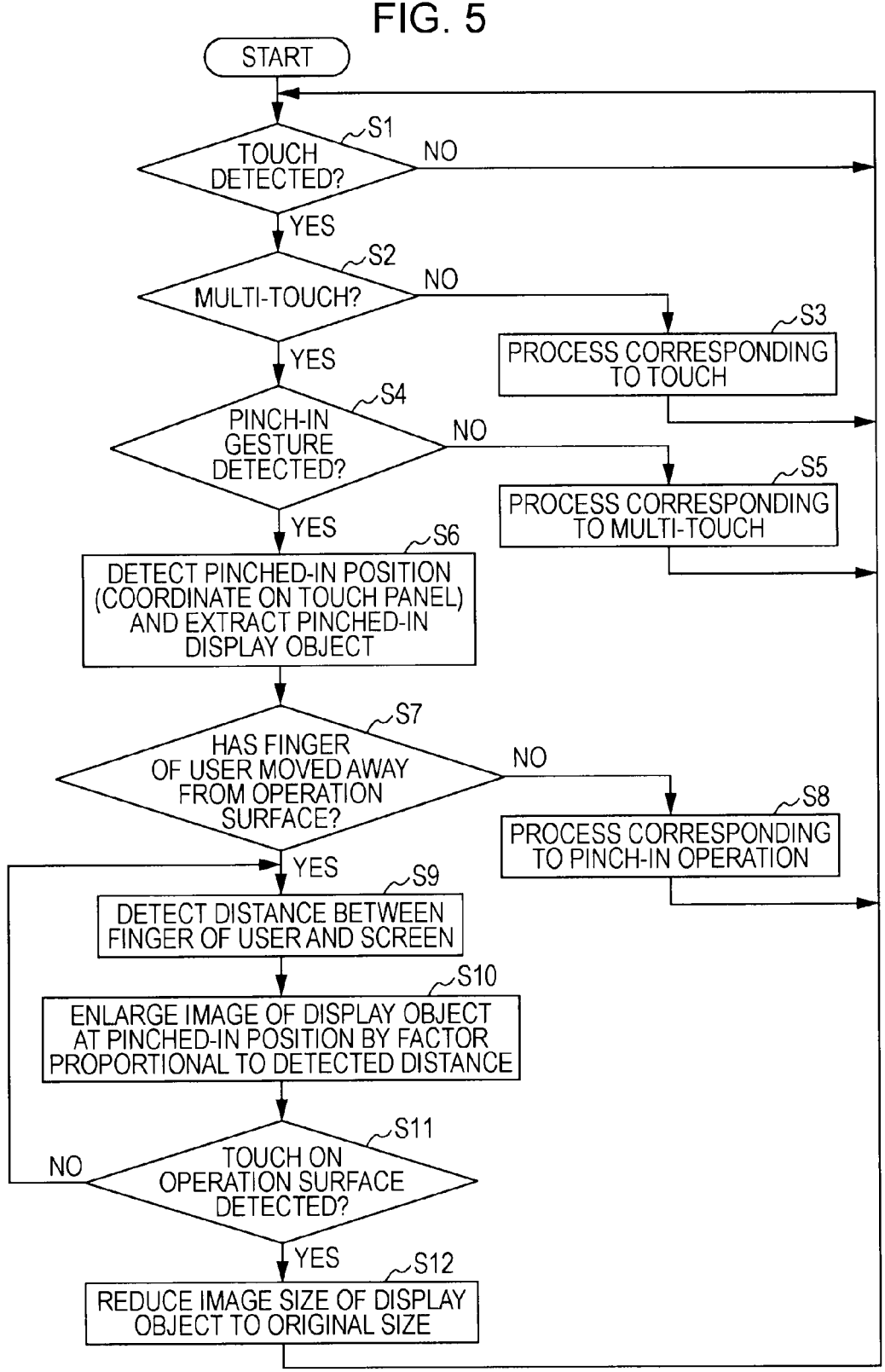

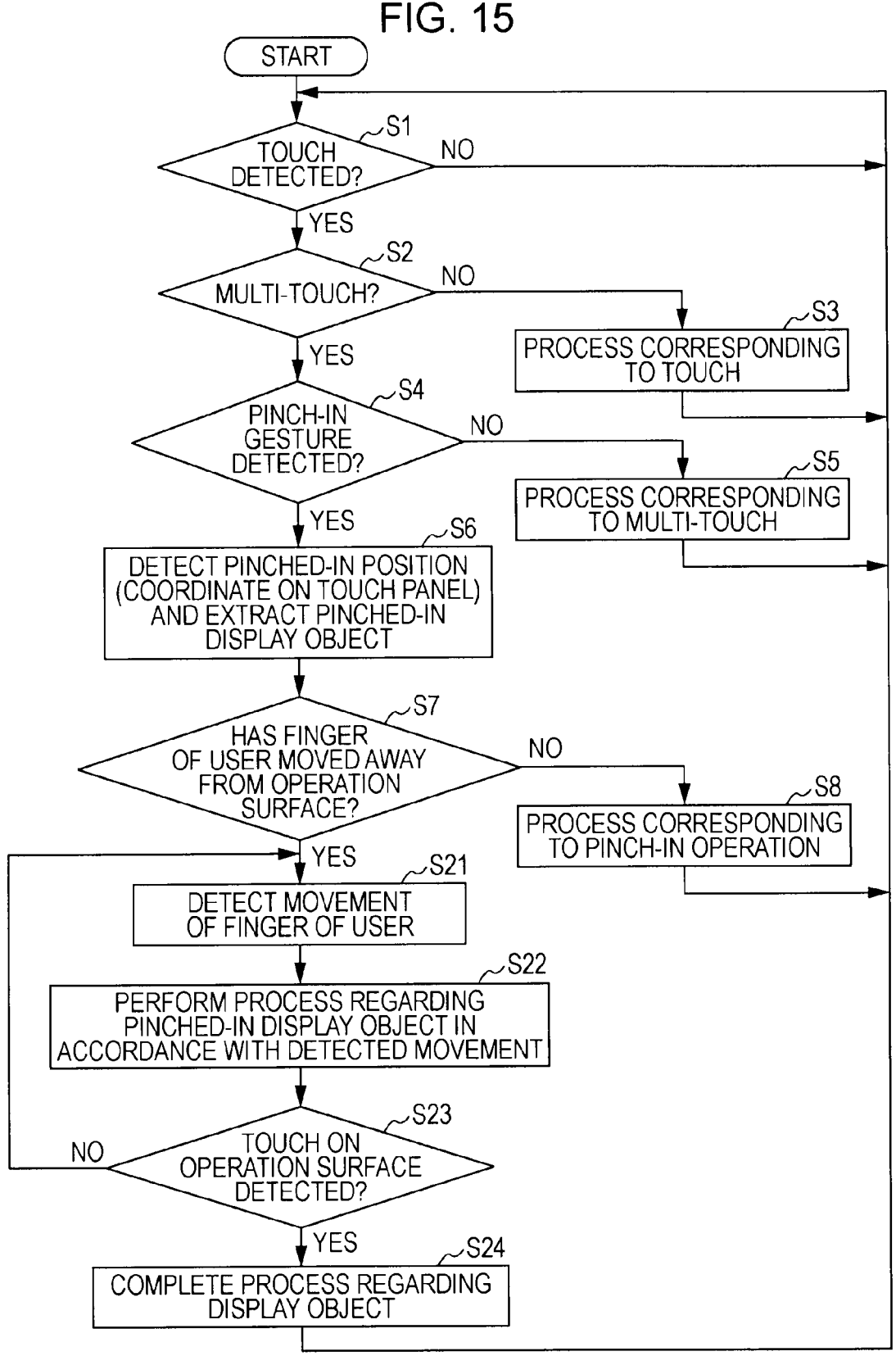

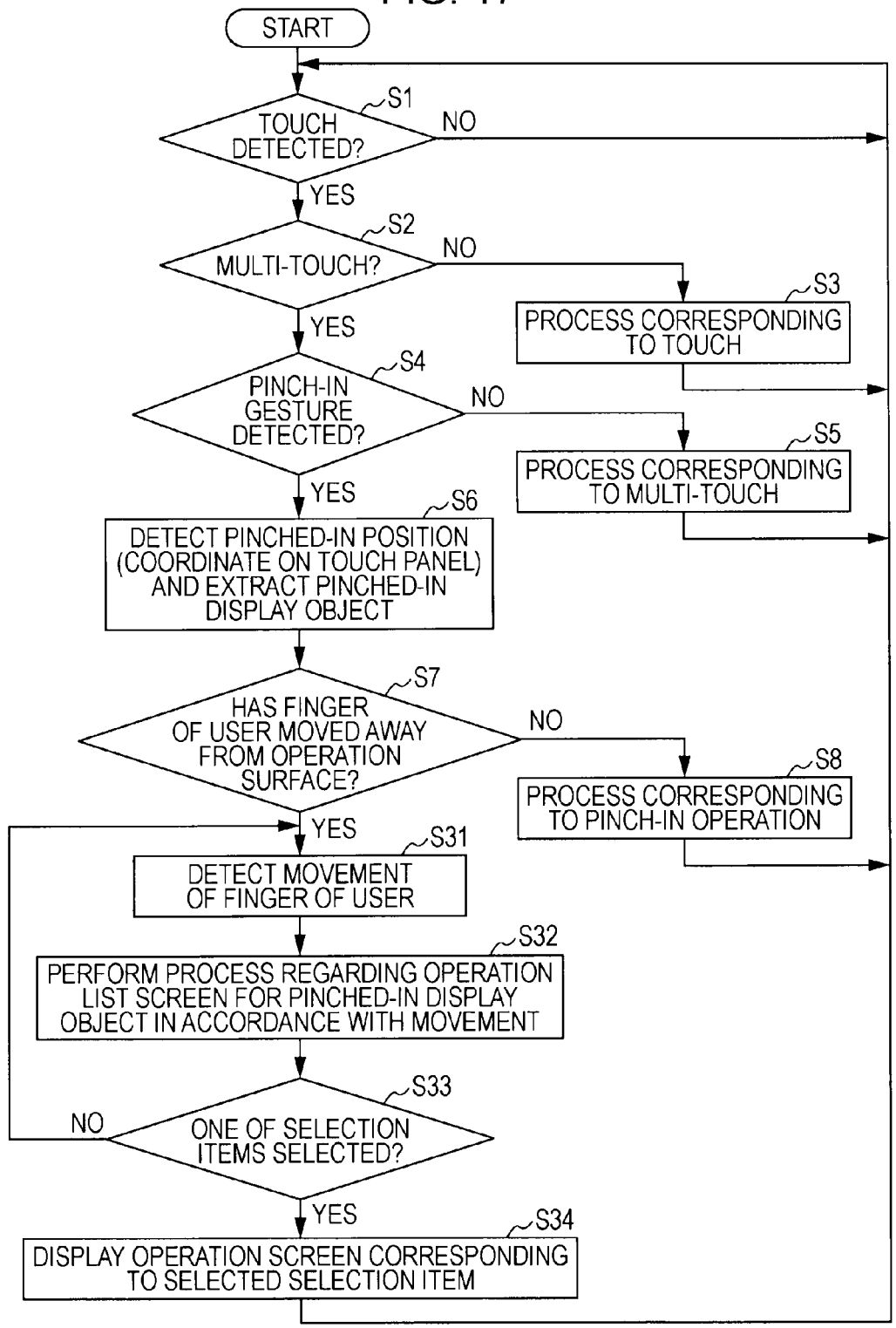

INFORMATION PROCESSING APPARATUS AND INFORMATION PROCESSING METHOD

CROSS REFERENCE TO RELATED APPLICATIONS

This application is related to and claims priority under 35 U.S.C. §119(e) to Provisional Application Ser. No. 61/350,955, filed Jun. 3, 2010, the contents of which are hereby incorporated herein by reference.

BACKGROUND

1. Field

The present specification relates to an apparatus including a relatively large display screen and a touch panel, such as a cell phone, a mobile information terminal, or a personal computer, and a method for inputting information to the apparatus.

2. Description of the Related Art

Some cell phones include a display device having a relatively large display screen, such as a liquid crystal display (LCD) or an organic electro-luminescence (EL) display, and a touch panel.

In such cell phones, an input unit is formed from display information displayed on the display screen of the display device and the touch panel. By touching the touch panel with, for example, a finger, a user can input various information to the cell phone.

In addition, in order to allow the user to operate a cell phone in a more intuitive way, a multi-touch operation in which a user can touch their fingers on the touch panel and move the fingers (i.e., a gesture operation) is provided.

More specifically, for example, Japanese Unexamined Patent Application Publication (Translation of PCT Application) No. 2009-522669 describes a mobile electronic apparatus having a multi-touch input function that allows a user to perform gesture input (e.g., pinch input) by detecting and recognizing a multi-touch operation.

In general, existing information processing apparatuses allow only a touch operation on a touch panel. However, a multi-touch input operation as described in Japanese Unexamined Patent Application Publication (Translation of PCT Application) No. 2009-522669 allows a user to a new operation that was not previously possible in other existing apparatuses. Thus, the multi-touch input operation provides further user-friendly electronic apparatuses.

However, the multi-touch operation as described in Japanese Unexamined Patent Application Publication (Translation of PCT Application) No. 2009-522669 is recognized only when the user touches the surface of a touch panel (i.e., a two-dimensional operation). Thus, the multi-touch operation is included in a category of existing touch operations, since the multi-touch operation is a touch operation on a touch panel.

Therefore, in order to provide ease of operation to the user, it is desirable that an information processing apparatus that receives a user operation allow a user to perform a further intuitive operation in addition to a multi-touch operation.

BRIEF SUMMARY

Accordingly, the present embodiments provide an input receiving unit that allows a simple operation of a user in various apparatuses operated by the user and allows the user to perform a further intuitive operation that increases the ease of operation of the user.

According to an embodiment, an information processing apparatus includes a display device, pointed position detecting means for detecting a specified position by a touch operation of a pointing device on a screen of the display device; sensor means for detecting a position of the pointing device when the pointing device is not in contact with the screen of the display device; and control means for recognizing the touch operation detected by the pointed position detecting means and controlling the information processing apparatus in accordance with the recognized touch operation and the position of the pointing device detected by the sensor means.

According to another embodiment, an information processing method, implemented on an information processing apparatus having a display device, is provided which includes: detecting a specified position by a touch operation of a pointing device on a screen of the display device; detecting, with a sensor unit, a position of the pointing device when the pointing device is not in contact with the screen of the display device; and recognizing the touch operation and controlling the information processing apparatus in accordance with the recognized touch operation and the position of the pointing device detected by the sensor unit.

According to another embodiment, an information processing apparatus is provided that includes: a display device; a pointed position detecting unit configured to detect a specified position by a touch operation of a pointing device on a screen of the display device; a sensor unit configured to detect a position of the pointing device when the pointing device is not in contact with the screen of the display device; and a control unit configured to recognize the touch operation detected by the pointed position detecting unit and control the information processing apparatus in accordance with the recognized touch operation and the position of the pointing device detected by the sensor unit.

According to the information processing apparatus, one input receiving means is formed from display information displayed on the display surface of the display device. In addition, additional input receiving means is formed from the sensor means. Then, the control means performs a predetermined process in accordance with a touch instruction operation performed by the user detected by the pointed position detecting means and the position of the pointing device, such as a finger of the user, relative to the operation surface of the pointed position detecting means detected by the sensor means.

In this way, unlike existing operation methods, a three-dimensional operation input in which the position of a pointing device, such as a finger of a user, relative to the operation surface of the pointed position detecting means is taken into account is allowed. That is, unlike existing input receiving means, a novel and simple input receiving means that allows a user to perform a more intuitive operation is provided. Thus, increased operability can be provided to users.

According to the present embodiments, a novel and simple input receiving means can be provided in a variety of apparatuses operated by a user. Thus, a more intuitive operation is provided to the user and, therefore, increased operability can be provided to the user.

BRIEF DESCRIPTION OF THE DRAWINGS

FIG. 5 is a flowchart illustrating the processes of selecting a target display object and enlarging the image of the display object performed in the cell phone;

FIG. 15 is a flowchart illustrating a process performed on a display object by the cell phone including a plurality of proximity sensors;

FIG. 17 is a flowchart illustrating a process of displaying an operation list screen (an operation menu) regarding a selected display object.

DETAILED DESCRIPTION

Embodiments are described below with reference to the accompanying drawings. In the embodiments described below, a cell phone called a smart phone is described as an example.

Note that in a smart phone, a cell phone is integrated into a mobile information terminal. That is, a smart phone has a variety of functions in addition to a simple phone function that allows a user to perform normal voice communication. The variety of functions include a connecting function to a network, such as the Internet, a scheduling management function, and a personal information management function which are generally provided by a mobile information terminal.

[Exemplary Configuration of Cell Phone]

Figure 1:
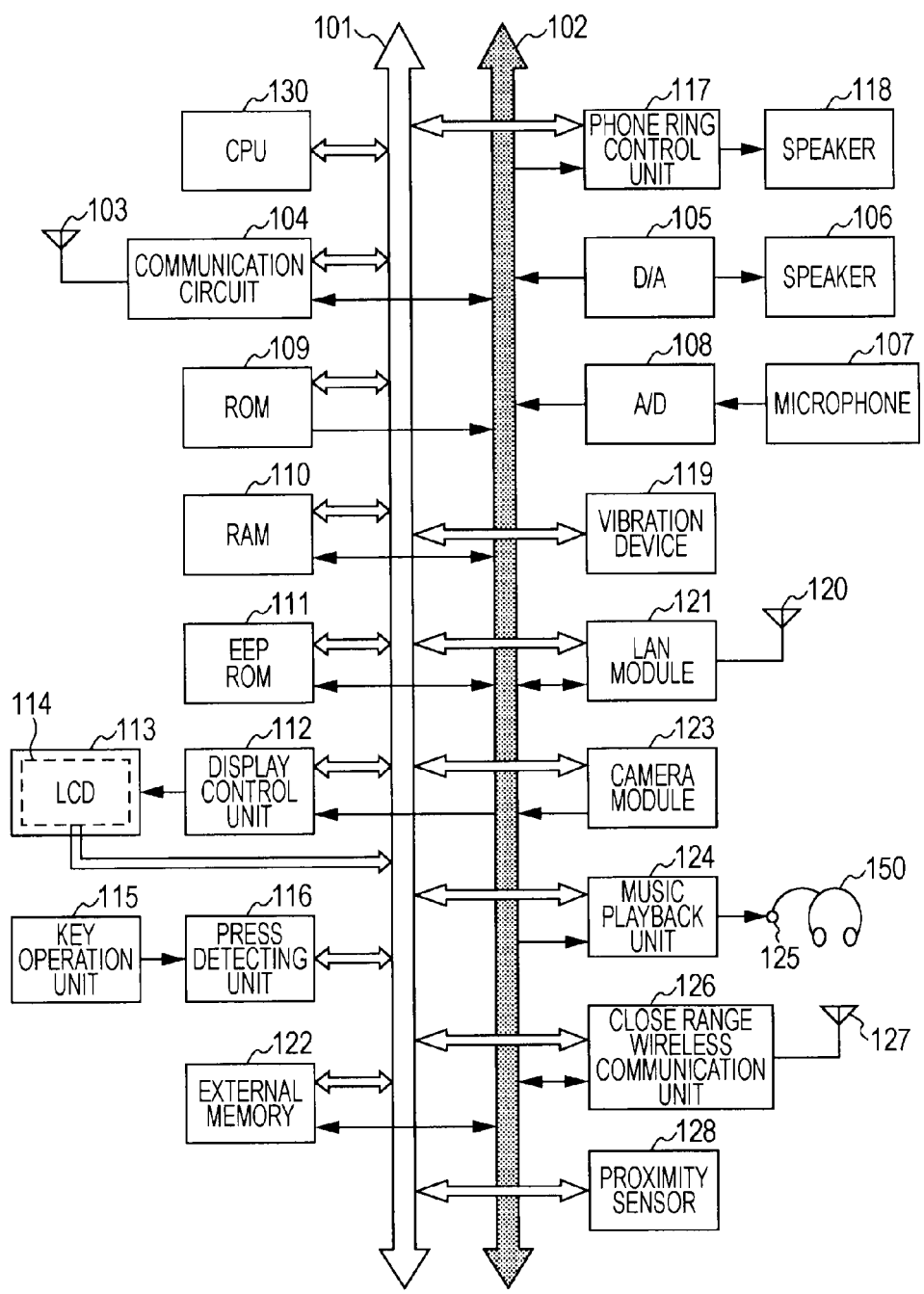
FIG. 1 is a block diagram illustrating an exemplary configuration of a cell phone according to an embodiment.
Figure 2:
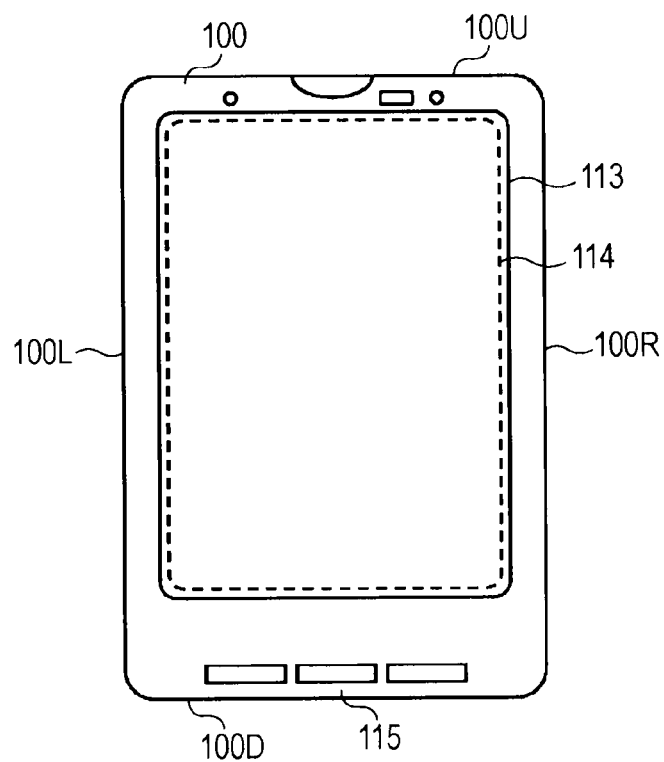
FIG. 2 is an external view of the cell phone shown in FIG. 1.

A cell phone 100 according to an embodiment is described first. FIG. 1 is a block diagram illustrating an exemplary configuration of a cell phone 100 according to the embodiment. FIG. 2 is an external view of the cell phone 100 according to the embodiment.

As shown in FIG. 1, according to the present embodiment, the cell phone 100 includes a control line (a control bus) 101 used for transmission of a control signal and a data line (a data bus) 102 used for transmission of a variety of types of data.

As shown in FIG. 1, a central processing unit (CPU) 130, a communication circuit 104, a read only memory (ROM) 109, and a random access memory (RAM) 110 are connected to the control line 101.

In addition, an electrically erasable and programmable ROM (EEPROM) 111, a display control unit 112, a press detecting unit 116, a phone ring control unit 117, a vibration device 119, and a local area network (LAN) module 121 are connected to the control line 101. Furthermore, an external memory 122, a camera module 123, a music playback unit 124, and a close range wireless communication unit 126, and a proximity sensor 128 are connected to the control line 101.

As shown in FIG. 1, the communication circuit 104, the ROM 109, the RAM 110, the EEPROM 111, the display control unit 112, a D/A converter 105, an A/D converter 108, and the phone ring control unit 117 are connected to the data line 102. In addition, the LAN module 121, the external memory 122, the camera module 123, the music playback unit 124, and the close range wireless communication unit 126 are connected to the data line 102.

As shown in FIG. 1, a transmitting and receiving antenna 103 is connected to the communication circuit 104. An LCD 113 serving as a display unit is connected to the display control unit 112.

In addition, a touch panel 114 is disposed over the display screen of the LCD 113. Thus, the information displayed on the LCD 113 and the touch panel 114 forms an input unit.

That is, the display screen of the LCD 113 has a relatively large size (e.g., 4 inches or greater). As indicated by the external view shown in FIG. 2, the display screen of the LCD 113 occupies almost all of the front surface of the cell phone 100 (e.g., 60% or more).

In addition, as shown in FIG. 2, the touch panel 114 is disposed over the entirety of the display screen of the LCD 113. For example, the touch panel 114 is bonded to the display screen. That is, the operation surface of the touch panel 114 is aligned with the display screen of the LCD 113.

Accordingly, the coordinate system of the display screen of the LCD 113 is the same as the coordinate system of the operation surface of the touch panel 114. The user touches a certain point on the operation surface of the touch panel 114 with their finger or a stylus.

At that time, when a number is displayed on the display screen of the LCD 113 at a point corresponding to that touch point, the CPU 130 of the cell phone 100 can determine that the user selects and inputs the number.

In this way, in the cell phone 100 according to the present embodiment, the LCD 113 and the touch panel 114 form an input unit that receives an instruction (operation input) from a user. A variety of types of touch panel, such as a pressure-sensitive touch panel or an electrostatic touch panel, can be used as the touch panel 114.

In addition, as shown in FIG. 1, a key operation unit 115 is connected to the press detecting unit 116. Thus, an input unit different from the input unit including the touch panel 114 is formed. That is, as shown in FIG. 2, three basic operation keys ("Home", "Menu", and "Return") are disposed in the lower-most section of the front surface of the cell phone 100.

Furthermore, a power button switch (not shown in FIG. 2) is disposed on an upper surface 100U of the cell phone 100. Still furthermore, a volume key (not shown) for controlling the volume of sound and a shutter key (not shown) used for a camera function (described in more detail below) are disposed on a left side surface 100L and a right side surface 100R of the cell phone 100 at predetermined positions.

In this way, according to the present embodiment, a variety of operation keys (hardware keys) and button switches disposed on the body of the cell phone 100 form the key operation unit 115.

In addition, a LAN transmitting and receiving antenna 120 is connected to the LAN module 121. A speaker 106 that serves as a telephone receiver is connected to the D/A converter 105. The speaker 106 is disposed in the uppermost section of the front surface of the cell phone 100.

A microphone 107 used as a telephone transmitter is connected to the A/D converter 108. For example, the microphone 107 is disposed on a bottom surface 100D of the cell phone 100. A speaker 118 is connected to the phone ring control unit 117.

The music playback unit 124 allows, for example, an earphone 150 to be connected thereto via an output terminal 125. A close range wireless transmitting and receiving antenna 127 is connected to the close range wireless communication unit 126.

In addition, according to the present embodiment, the proximity sensor 128 is disposed on the back of the touch panel 114 of the cell phone 100. Thus, the cell phone 100 can detect the position (the distance) of a pointing device (e.g., a finger of the user) from the operation surface of the touch panel 114.

The proximity sensor 128 is of an infrared type. An infrared proximity sensor includes a light emitting element that outputs an infrared light ray and a light receiving element that receives the infrared light ray and converts the received light ray into an electrical signal. The infrared light ray emitted from the light emitting element is reflected by an object whose position (the distance thereto) is to be measured and is returned to the proximity sensor 128. The light receiving element receives the reflected infrared light ray and converts the infrared light ray into electrical power. At that time, the position (the distance) of the finger of the user from the operation surface of the touch panel 114 can be correctly detected by using the converted electrical power.

In addition, the cell phone 100 includes, for example, a rechargeable battery pack (not shown) used as a power supply. The cell phone 100 further includes a power supply circuit (not shown) that supplies driving power to each circuit component when the cell phone 100 is turned on.

Furthermore, the CPU 130, the ROM 109, the RAM 110, and the EEPROM 111 form a microcomputer in the cell phone 100. This microcomputer functions as a control unit that controls all components of the cell phone 100.

Note that the external memory 122 is formed from a memory card including, for example, a semiconductor memory having a relatively large capacity (e.g., several tens of megabytes to several gigabytes). The external memory 122 is removably mounted in the cell phone 100.

As described in more detail below, the external memory 122 can store a variety of types of data, such as music data and image data downloaded via the Internet or a LAN or moving image data and still image data captured by the camera module 123.

The external memory 122 is replaceable in accordance with, for example, the memory capacity or the type of stored data. In addition, by providing a plurality of slots for the external memory 122 in the cell phone 100, a plurality of the external memories 122 can be mounted in the cell phone 100 at the same time. Thus, the user can use the plurality of external memories 122 for different purposes.

[Basic Operation Performed by Cell Phone 100]
Operation Regarding Telephone Function The basic operation performed by the cell phone 100 shown in FIG. 1 is described next. First, an operation (a process) performed when the cell phone 100 responds to a received telephone call is described.

A transmitted call notification signal is received by the transmitting and receiving antenna 103 and is subjected to a tuning process performed by the communication circuit 104. The signal subjected to a tuning process performed by the communication circuit 104 is demodulated by the communication circuit 104, and the demodulated signal is transmitted to the CPU 130 via the control line 101.

For example, if the tuned and received signal is a call notification signal destined for the cell phone 100, the CPU 130 reads, from, for example, the ROM 109, prestored ringtone data that serves as a ring alert and supplies the ringtone data to the phone ring control unit 117.

The phone ring control unit 117 generates an analog ringtone signal from the supplied ringtone data and supplies the generated ringtone signal to the speaker 118. In this way, a ringtone corresponding to the ringtone signal is output from the speaker 118. Thus, the user of the cell phone 100 knows that they are receiving a call.

In the same manner, when the CPU 130 detects a call notification signal destined for the cell phone 100, the CPU 130 can control the vibration device 119 and vibrate the cell phone 100 so as to notify the user of a call. Note that call notification can be made by using a ringtone and vibration at the same time or by using only one of a ringtone and vibration.

When the user knows that they are receiving a call to the cell phone 100, the user performs a predetermined operation on the cell phone 100 in order to start voice communication.

For example, the predetermined operation includes touching the operation surface of the touch panel 114 disposed on a call initiation key (an off-hook key) displayed on the display screen of the LCD 113 with, for example, a finger. Note that if a call initiation key (an off-hook key) is provided on the key operation unit 115, the user may press that key.

When the predetermined operation to initiate a call is performed, this information is sent to the CPU 130 via the control line 101. Note that if the predetermined operation to start talking using the key operation unit 115 is performed, this operation is detected by the press detecting unit 116 and this information is sent to the CPU 130 via the control line 101.

Upon receiving the information indicating that the predetermined operation to start talking has been performed, the CPU 130 controls the communication circuit 104 so as to perform a predetermined process of establishing a communication link with a network, such as transmitting a response signal. In this way, a communication link is connected between the communication terminal that placed a call to the cell phone 100 and the cell phone 100 and, therefore, voice communication is available therebetween.

That is, a signal transmitted from the other party of communication is received and tuned via the transmitting and receiving antenna 103 and the communication circuit 104. The received and tuned signal transmitted from the other party of communication is demodulated by the communication circuit 104 into a baseband signal. The baseband signal is supplied to the D/A converter 105 via the data line 102.

The D/A converter 105 converts the supplied baseband signal into an analog signal and supplies the analog signal to the speaker 106. Thus, voice in accordance with the signal transmitted from the other party of communication is output from the speaker 106.

In addition, the voice from the user of the cell phone 100 is collected by the microphone 107 and is supplied to the A/D converter 108 in the form of an analog electrical signal. The A/D converter 108 converts the supplied analog sound signal into a digital signal (a baseband signal) and supplies the digital signal to the communication circuit 104 via the data line 102.

The communication circuit 104 generates a transmission signal including the supplied digital signal through, for example, a modulation process and transmits the transmission signal from the transmitting and receiving antenna 103. In this way, the voice of the user is transmitted to the other party of communication. In such a manner, the user can answer a call received by the cell phone 100, establish a communication link with the other party of communication who called the cell phone 100, and communicate with the other party of communication.

An exemplary process performed when the user places a call using the cell phone 100 is described next. As described above, when placing a call using the cell phone 100, the user inputs a desired telephone number through the input unit formed from the LCD 113 and the touch panel 114.

Subsequently, the CPU 130 recognizes the number information displayed on the display screen of the LCD 113 at a position corresponding to a touched position in the operation surface of the touch panel 114. The CPU 130 then temporarily stores the number information recognized in this manner in, for example, the RAM 110. Thereafter, the user performs a predetermined operation to place a call through, for example, the touch panel 114. At that time, the CPU 130 generates a call signal including the received telephone number and transmits the call signal via the communication circuit 104 and the transmitting and receiving antenna 103.

The call signal is transmitted to a telephone terminal of a desired communication partner via the equipment of a telephone company, such as a base station and a switching system. If the communication partner performs a reply operation to answer the call in response to the call signal, a response signal is transmitted from the communication partner.

Upon receiving the response signal, the communication circuit 104, under the control of the CPU 130, recognizes that a communication link is established with the communication partner. In addition, as in the above-described case in which communication is performed in response to a call to the cell phone 100, voice communication is performed via the transmitting and receiving antenna 103, the communication circuit 104, the D/A converter 105, the speaker 106, the microphone 107, and the A/D converter 108.

Note that when placing a call, the user can select a desired telephone number in phone book data preregistered in, for example, the EEPROM 111 of the cell phone 100 and perform a predetermined operation to place a call.

In addition, when a call is received, the telephone number of the caller may be displayed on the LCD 113. In addition, the current time may be displayed on the LCD 113. Furthermore, when the above-described phone book data is registered or selected, the telephone number and the name corresponding to the telephone number can be displayed on the LCD 113. Still furthermore, a variety of guidance messages and warning messages can be displayed on the LCD 113.

That is, the display control unit 112 displays a variety of information items on the LCD 113 under the control of the CPU 130. Note that the LCD 113 includes a relatively large display screen in order to provide an excellent viewability to the user, as shown in FIG. 2.

In this way, the cell phone 100 can answer a call and place a call to a desired communication partner.

[Operation Performed for Internet Access]

An exemplary access function to the Internet is described next. According to the present embodiment, the cell phone 100 accesses the Internet via a function provided by, for example, a telephone company. Thus, the cell phone 100 can access a desired website, search for desired information, and download the desired information. In addition, the cell phone 100 can send and receive an e-mail via the Internet.

When the user accesses the Internet using the cell phone 100, the user performs a predetermined operation on the input unit formed from the LCD 113 and the touch panel 114.

The CPU 130 detects that the predetermined operation has been performed for accessing the Internet using a touched position in the operation surface of the touch panel 114 and the information displayed on the display screen of the LCD 113 at a position corresponding to the touched position.

In such a case, the CPU 130 controls the communication circuit 104 through the control line 101 so that the communication circuit 104 generates a connection request to the Internet. Thereafter, the CPU 130 transmits the connection request from the transmitting and receiving antenna 103. Upon receiving the connection request to the Internet, a system of the telephone company connects the cell phone 100 that transmitted the request to the Internet.

In this way, the cell phone 100 is connected to the Internet. Thus, the cell phone 100 can access a desired server and exchange packet data with the server. Accordingly, the cell phone 100 can request the server to transmit desired information and receive the information from the server.

In addition, the cell phone 100 can generate an e-mail to be sent and store the e-mail in a send folder in the EEPROM 111. In this case, the user inputs characters via the input unit formed from the LCD 113 and the touch panel 114. At that time, the input characters are displayed on the LCD 113 via the display control unit 112. Thus, the user can type an e-mail to be sent while looking at the characters.

In order to send the e-mail generated in the send folder in the EEPROM 111, the user performs a predetermined operation using the input unit formed from the LCD 113 and the touch panel 114.

Thus, as described above, the CPU 130 can detect that the predetermined operation to send the e-mail has been performed using the touched position on the operation surface of the touch panel 114 and the information displayed on the display screen of the LCD 113 at a position corresponding to the touched position. The CPU 130 then controls the communication circuit 104 so that the e-mail generated in the send folder in the EEPROM 111 is sent to a target mail server.

In addition, if an e-mail destined for the cell phone 100 is stored in a mail server for the cell phone 100, the user performs a predetermined operation in order to receive the e-mail destined for the cell phone 100 using the input unit formed from the LCD 113 and the touch panel 114.

As described above, the CPU 130 can detect that the predetermined operation to receive the e-mail destined for the cell phone 100 has been performed using the touched position on the operation surface of the touch panel 114 and the information displayed on the display screen of the LCD 113 at a position corresponding to the touched position.

At that time, the CPU 130 controls the communication circuit 104 so as to access the mail server for the cell phone 100 and download the e-mail destined for the cell phone 100. Thus, the CPU 130 stores the e-mail destined for the cell phone 100 in a reception folder in the EEPROM 111.

In this way, the e-mail stored in the reception folder in the EEPROM 111 and destined for the cell phone 100 is retrieved under the control of the CPU 130 and is supplied to the display control unit 112 via the data line 102.

Thereafter, the e-mail destined for the cell phone 100 is supplied from the display control unit 112 to the LCD 113 and is displayed on the display screen of the LCD 113. In this way, an e-mail sent from a communication partner to the cell phone 100 can be retrieved and displayed on the LCD 113. Thus, the user can read the e-mail.

As described above, the cell phone 100 has an Internet access function in addition to a phone communication function. Accordingly, the cell phone 100 can receive information and exchange e-mails via the Internet. That is, the cell phone 100 can further perform data communication via the Internet in addition to phone communication as a wide area communication function.

[Operation Performed for Other Functions]

In addition, upon receiving a predetermined operation input to perform communication via the LAN module 121 through the input unit formed from the LCD 113 and the touch panel 114, the CPU 130 controls the LAN module 121. Thereafter, the CPU 130 can connect the cell phone 100 to a predetermined LAN via, for example, a wireless router and send and receive data to and from a device connected to the LAN.

The camera module 123 includes an image capturing lens, an image pickup device, such as a charge coupled device (CCD) image sensor or a complementary Metal Oxide Semiconductor (CMOS) image sensor, and a camera signal processing circuit.

Under the control of the CPU 130, the camera module 123 captures a still image or a moving image of a subject and acquires the image in the form of digital image data. The digital image data acquired in this manner is supplied to the external memory 122 via the data line 102 and is stored in the external memory 122.

That is, when an operation to start image capturing is performed (e.g., when the shutter key disposed on the key operation unit 115 is pressed), this operation is detected by the press detecting unit 116, which sends a message indicating this operation to the CPU 130 via the control line 101. In this case, the CPU 130 controls the camera module 123 to capture the image of a subject. Thus, image data acquired through the image capturing is stored in the external memory 122 via the data line 102. Note that a lens unit of the camera module 123 is disposed on a surface of the cell phone 100 opposite to the front panel having the LCD 113 thereon.

In addition, upon receiving an operation input from the user through the input unit formed from the LCD 113 and the touch panel 114, the CPU 130 allows the user to use image data stored in the external memory 122.

In this case, the image data stored in the external memory 122 is read out under the control of the CPU 130 and is supplied to the LCD 113 via the display control unit 112. Thus, the image data is displayed on the display screen of the LCD 113. In this way, the image data can be used.

In addition, upon receiving a predetermined operation input to play back music from the user through the input unit formed from the LCD 113 and the touch panel 114, information corresponding to the operation input is sent to the CPU 130 via the control line 101.

In this case, the CPU 130 reads out the music data to be played back from the external memory 122 and supplies the music data to the music playback unit 124 via the data line 102. The music playback unit 124 generates an analog sound playback signal from the supplied music data and outputs the sound playback signal from the output terminal 125. As shown in FIG. 1, an earphone 150 is connected to the output terminal 125. The user can listen to the playback sound using the earphone 150.

While the description has been made with reference to playback music data, the music playback unit 124 can play back a variety of types of sound data. Thus, the music playback unit 124 can play back voice data and other types of sound data.

The close range wireless communication unit 126 and the close range wireless transmitting and receiving antenna 127 of the cell phone 100 are used for providing an electronic money function. That is, electronic money information is transmitted and received through the close range wireless communication unit 126 and the close range wireless transmitting and receiving antenna 127. Note that the close range wireless communication unit 126 and the close range wireless transmitting and receiving antenna 127 comply with a predetermined close range wireless standard, such as Bluetooth.

In addition, the cell phone 100 includes a universal serial bus (USB) interface (I/F) (not shown). Thus, the cell phone 100 can be connected to a variety of external devices having a USB I/F. For example, by connecting a USB memory to the cell phone 100, a variety of types of data stored in the EEPROM 111 can be backed up into the USB memory. Furthermore, by connecting the cell phone 100 to a personal computer via the USB I/F, data can be backed up into a hard disk of the personal computer and the cell phone 100 can receive a variety of types of data from the personal computer.

The cell phone 100 further includes a clock circuit (not shown). Thus, the cell phone 100 can display the current time in a year-month-day format, a day of the week, and the current point in time. In addition, under the control of the CPU 130, the clock circuit can measure the elapsed time of a process and a variety of time intervals.

In this way, the cell phone 100 can be connected to a telephone network so as to perform phone communication. In addition, the cell phone 100 can be connected to the Internet so as to browse Web pages and download desired data. Furthermore, the cell phone 100 can upload data to a target server. Still furthermore, the cell phone 100 can be connected to a LAN via the LAN module 121 and communicate a variety of types of data via the LAN.

The cell phone 100 further has a camera function. The cell phone 100 can store, in the external memory 122, moving image data and still image data acquired by capturing a moving image and a still image. In addition, the cell phone 100 can use the moving image data and still image data stored in the external memory 122 by playing back the data. Furthermore, the cell phone 100 can play back music data stored in the external memory 122 using a music playback function.

Still furthermore, according to the present embodiment, the cell phone 100 can pre-install a variety of application programs in, for example, the EEPROM 111. By executing the programs, the cell phone 100 can provide a variety of functions, such as an address book management function, a schedule management function, and a map search function.

[Operation Input Through Touch Panel]

According to the present embodiment, the touch panel 114 of the cell phone 100 can detect a plurality of touch operations simultaneously performed on the operation surface of the touch panel 114 using a finger of the user or a stylus. That is, the touch panel 114 can output the coordinate data items indicating the plurality of touched positions.

In addition, the touch panel 114 can detect each of operation inputs repeatedly performed on the operation surface of the touch panel 114 and output the coordinate data items indicating the touched positions.

Furthermore, while a finger of the user or a stylus is in contact with the operation surface of the touch panel 114, the touch panel 114 can detect the touched positions at predetermined intervals and output the coordinate data items indicating the plurality of touched positions.

Thus, the touch panel 114 can accept a variety of touch instruction operations (touch operation inputs) from the user, such as a tap operation, a double tap operation, a drag operation, a flick operation, and a pinch operation, and output the coordinate information in accordance with the type of operation.

As used herein, the term "tap operation" refers to an operation of the user indicating a predetermined point on the operation surface of the touch panel 114 by a single touch. The term "double tap operation" refers to an operation of the user tapping a predetermined point on the operation surface of the touch panel 114 twice in quick succession.

The term "drag operation" refers to an operation of the user touching the operation surface of the touch panel 114 with their finger or a stylus and moving the finger or the stylus. The term "flick operation" refers to an operation of the user touching the operation surface of the touch panel 114 with their finger or a stylus and performing a quick flicking operation in any direction.

The term "pinch operation" refers to an operation of placing two fingers of the user on the operation surface of the touch panel 114 and opening or closing the two fingers. In this case, the operation of closing the two fingers on the operation surface is referred to as a "pinch-in operation", while the operation of opening the two fingers on the operation surface is referred to as a "pinch-out operation"

[New Form of Operation Input]

According to the present embodiment, the cell phone 100 can accept a three-dimensional operation input from a user by using the touch panel 114 and the proximity sensor 128. That is, the CPU 130 of the cell phone 100 can perform a predetermined operation in accordance with a touch input operation performed on the touch panel 114 by the user using, for example, their finger and the position (the distance) of the finger from the operation surface of the touch panel 114 after the contact input operation has been performed.

The operation of selecting a desired display object through a multi-touch operation and enlarging the display object in accordance with the positions of the fingers used for multi-touch operation relative to the operation surface of the touch panel 114 is described in detail below. In this example, a pinch-in operation, which is one example of multi-touch operations, is used for selecting a display object.

Figure 3A:
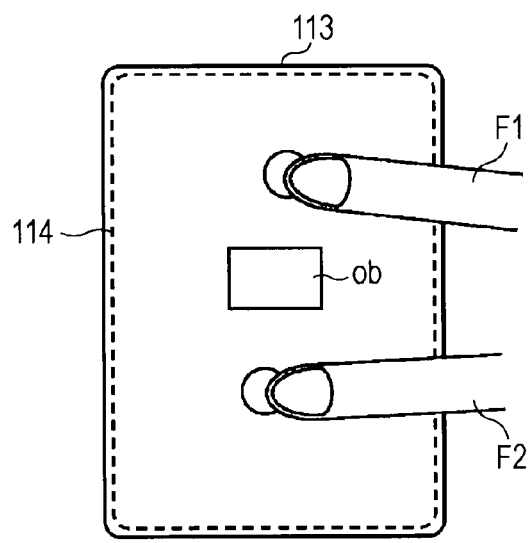
FIGS. 3A and 3B illustrate an example of an operation input from a user to the cell phone shown in FIG. 1 and a process performed in response to the operation input.
Figure 3B:
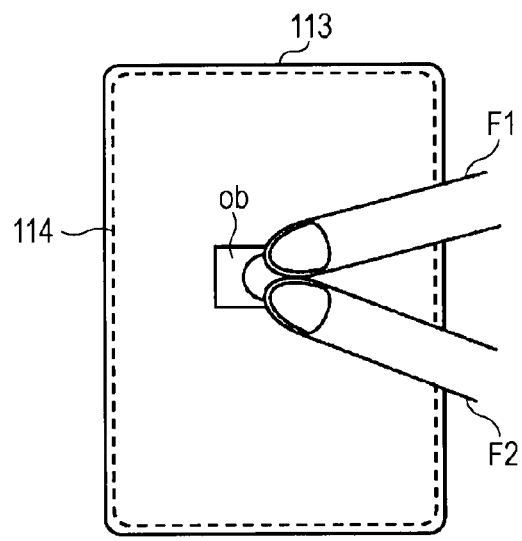
Figure 4A:
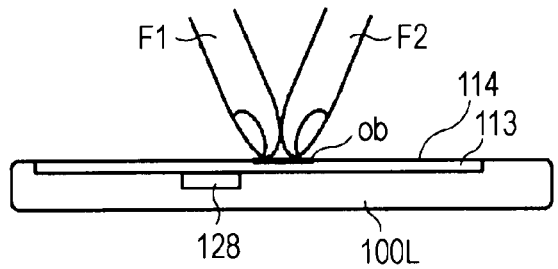
FIGS. 4A to 4C illustrate an example of an operation input from a user to the cell phone shown in FIG. 1 and a process performed in response to the operation input.
Figure 4B:
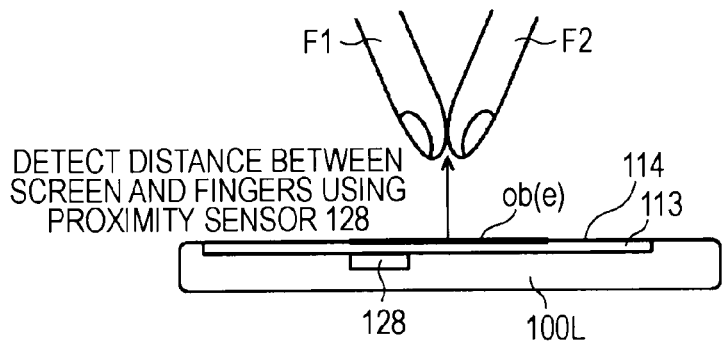
Figure 4C:
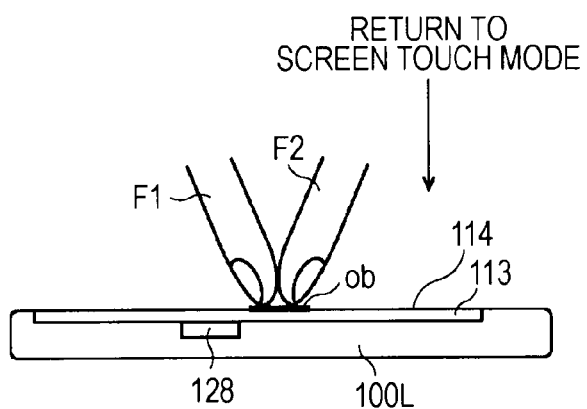

FIGS. 3A and 3B and FIGS. 4A to 4C illustrate an example of an operation input from a user to the cell phone 100 and a process performed in response to the operation input according to the present embodiment. FIGS. 3A and 3B are top views of the display screen of the LCD 113. FIGS. 4A to 4C are cross-sectional views of the cell phone 100 viewed from the left side surface of the cell phone 100.

For example, the window of a Web browser is displayed in the display screen of the LCD 113. As shown in FIG. 3A, a display object ob to be enlarged is displayed at, for example, the center of the display screen of the LCD 113. In such a case, as shown in FIG. 3A, the user places their fingers F1 and F2 on the operation surface of the touch panel 114 disposed on the LCD 113 and vertically pinches the display object ob with the fingers F1 and F2.

Note that in FIGS. 3A and 3B, circles under the fingers F1 and F2 of the user indicate that the fingers F1 and F2 are placed on the operation surface of the touch panel 114 bonded to the display screen of the LCD 113.

In general, the thumb and forefinger of the hand are used for the pinch operation. However, the two fingers are not limited thereto. Any two fingers that can be simultaneously used for a pinch operation on the operation surface of the touch panel 114 can be selected. Accordingly, the forefinger of the right hand and the forefinger of the left hand can be used for the pinch operation.

Thereafter, the user performs a pinch-in operation in which the user moves the fingers F1 and F2 placed on the operation surface of the touch panel 114 towards each other. Subsequently, as shown in FIG. 3B, the two fingers are placed on the target display object ob. Thus, through the above-described pinch-in operation, the target display object ob is pinched by the fingers.

FIG. 4A is a cross-sectional view of the cell phone 100 and the fingers shown in FIG. 3B viewed from the left side surface of the cell phone 100. In FIG. 4A, the bold line under the fingers of the user indicates the target display object ob. Thereafter, as shown in FIG. 4B, the fingers F1 and F2 shown in FIGS. 3A and 3B are moved away from the operation surface of the touch panel 114 of the cell phone 100 in the perpendicular direction.

At that time, the proximity sensor 128 detects the positions of the fingers F1 and F2 with respect to the operation surface of the touch panel 114 (or the display screen of the LCD 113) (the distance between the fingers F1 and F2 and the operation surface of the touch panel 114). The information on the detected position is supplied to the CPU 130 via the control line 101.

If the distance between the fingers F1 and F2 and the operation surface of the touch panel 114 is greater than or equal to a predetermined distance, the image of the display object ob selected through the pinch-in operation (i.e., pinched by the fingers F1 and F2) is enlarged.

That is, the CPU 130 enlarges the image of the display object ob selected through the pinch-in operation by a factor proportional to the distance between the position of the fingers F1 and F2 and the operation surface of the touch panel 114 detected by the proximity sensor 128. The factor is computed in accordance with the distance between the fingers F1 and F2 and the operation surface of the touch panel 114.

Accordingly, the image of the display object ob selected in FIG. 4A is enlarged when the fingers F1 and F2 of the user move away from the operation surface in the perpendicular direction. Thus, in FIG. 4B, the display object ob is displayed as a display object ob (e).

Thereafter, when, as shown in FIG. 4C, the fingers F1 and F2 of the user that were moved away from the operation surface of the touch panel 114 as shown in FIG. 4B are placed on the operation surface of the touch panel 114 disposed on the display screen of the LCD 113 again, the size of the display object ob is reduced to the original size.

In this way, if the distance between the fingers F1 and F2 and the operation surface of the touch panel 114 is within a distance detectable range of the proximity sensor 128, the position of the fingers F1 and F2 relative to the operation surface of the touch panel 114 (the distance between the fingers F1 and F2 and the operation surface of the touch panel 114) can be measured. Thereafter, the size of the display object ob is enlarged by a factor proportional to the position of the fingers F1 and F2.

In addition, in this example, the size of the display object ob is not reduced to a size smaller than the original size. Accordingly, the size of the display object ob can be enlarged from the original size of the display object ob in accordance with the distance between the fingers F1 and F2 and the operation surface of the touch panel 114.

That is, when the fingers F1 and F2 of the user are moved away from the operation surface of the touch panel 114, the size of the display object ob is enlarged by a factor proportional to a distance detected by the proximity sensor 128. In contrast, when the fingers F1 and F2 of the user get closer to the operation surface of the touch panel 114, the factor is reduced so that the image of the display object ob is reduced from the size of the previous display object ob (e). That is, the previous display object ob (e) is enlarged and reduced.

[Summary of Enlargement Process of Display Object]

The processes of selecting a target display object and enlarging the image of the display object illustrated in FIGS. 3A and 3B and FIGS. 4A to 4C are summarized below with reference to a flowchart shown in FIG. 5. FIG. 5 is a flowchart illustrating the processes of selecting a target display object and enlarging the image of the display object performed in the cell phone 100. The processes shown in FIG. 5 are performed by mainly the CPU 130 after the cell phone 100 is turned on and the LCD 113 enters an information displayable mode.

When the cell phone 100 is turned on and the LCD 113 enters an information displayable mode, the CPU 130 monitors the detection output of the touch panel 114. Thus, the CPU 130 can determine whether a touch operation (a contact operation) on the operation surface of the touch panel 114 is detected (step S1).

If, in step S1, it is determined that a touch operation on the operation surface of the touch panel 114 has not been detected, the process in step S1 is repeated. In this way, the process in step S1 is repeated until a touch operation on the operation surface of the touch panel 114 is detected. At that time, the CPU 130 is in a wait mode until a touch operation on the operation surface of the touch panel 114 is detected.

However, if, in step S1, it is determined that a touch operation on the operation surface of the touch panel 114 has been detected, the CPU 130 determines whether the touch operation is a multi-touch operation (step S2). In step S2, it can be determined whether the touch operation is a multi-touch operation by determining whether the CPU 130 has received coordinate information on a plurality of touched positions from the touch panel 114.

If, in step S2, it is determined that the touch operation is not a multi-touch operation, the process corresponding to the touch operation is performed (step S3). Subsequently, the process in step S1 is repeated.

However, if, in step S2, it is determined that the touch operation is a multi-touch operation, the CPU 130 determines whether a pinch-in operation has been performed using the detection output of the touch panel 114 (step S4). That is, it can be determined whether a pinch-in operation is performed by tracking changes in the touched positions after a multi-touch operation has been performed.

If, in step S4, it is determined that a pinch-in operation has not been performed, a process corresponding to the multi-touch is performed (step S5). Thereafter, the process in step S1 is performed. For example, if a pinch-out operation is performed, the entirety of an image displayed in the display screen of the LCD 113 is enlarged in step S5. Alternatively, if only a multi-touch operation has been performed, it is difficult to identify which process is to be performed. Accordingly, a particular process is not performed in step S5. The CPU 130 repeats the process in step S1.

However, if, in step S4, it is determined that a pinch-in operation has been performed, the CPU 130 detects positions at which the pinch operation was performed and a display object on which the pinch operation was performed (step S6). That is, in step S6, using the coordinate information received from the touch panel 114, the CPU 130 identifies the position on the operation surface of the touch panel 114 at which a pinch-in operation is performed. Thereafter, the CPU 130 identifies a position in the display screen of the LCD 113 corresponding to the position on the operation surface. Thus, the CPU 130 identifies a display object displayed at the identified position.

Subsequently, the CPU 130 determines whether the finger of the user that has performed the pinch-in operation moves away from the operation surface of the touch panel 114 (the display screen of the LCD 113) on the basis of the detection output of the proximity sensor 128 (step S7).

If, in step S7, it is determined that the finger of the user remains placed on the operation surface of the touch panel 114, the CPU 130 performs a process corresponding to the pinch-in operation (step S8). In step S8, for example, the entirety of an image displayed on the display screen of the LCD 113 is reduced in accordance with the pinch-in operation.

However, if, in step S7, it is determined that the finger of the user has moved away from the operation surface of the touch panel 114, the CPU 130 detects the position of the finger of the user relative to the operation surface of the touch panel 114 using the detection output of the proximity sensor 128 (step S9). That is, in step S9, the distance between the finger of the user that performed the pinch-in operation and the operation surface of the touch panel 114 is detected.

Thereafter, the CPU 130 enlarges the display object identified in step S6 by a factor proportional to the position (the distance) detected in step S9 so that the center of the enlarged display object is aligned with a pinched position (a position at which the pinch-in operation ends) identified in step S6 and, subsequently, displays the enlarged display object (step S10).

Subsequently, the CPU 130 determines whether the finger of the user is placed on the operation surface of the touch panel 114 again using the detection output of the touch panel 114 (step S11). If, in step S11, it is determined that the finger of the user is not placed on the operation surface again, the CPU 130 repeats the process in step S9. That is, the CPU 130 repeats a process of enlarging the image of the display object by a factor in accordance with the distance between the finger of the user and the operation surface of the touch panel 114 and displaying the display object.

However, if, in step S11, it is determined that the finger of the user is placed on the operation surface again, the CPU 130 determines that the user has instructed the cell phone 100 to complete the enlargement process of the identified display object. Thus, the CPU 130 reduces the size of the enlarged display object to the original size and displays the display object (step S12). Subsequently, the CPU 130 repeats the process in step S1.

As described above, according to the present embodiment, the cell phone 100 selects a display object displayed on the display screen of the LCD 113 through a pinch-in operation on the operation surface of the touch panel 114. Subsequently, when a finger used for the pinch-in operation and placed in the image of the display object is moved away from the operation surface of the touch panel 114, the cell phone 100 can enlarge the selected display object by a factor proportional to the distance between the finger of the user and the operation surface of the touch panel 114.

In this way, in addition to a two-dimensional operation input on the operation surface of the touch panel 114, an operation input that takes into account the distance between the finger of a user that performed a touch operation and the operation surface of the touch panel 114 (i.e., a three-dimensional operation input) is allowed for the user.

Accordingly, the image of a display object can be enlarged through an intuitive operation input in which the user picks up a desired display object. That is, an intuitive operation input that was not previously possible can be provided.

[Other Examples of Selection Operation of Display Object]

Figure 6:
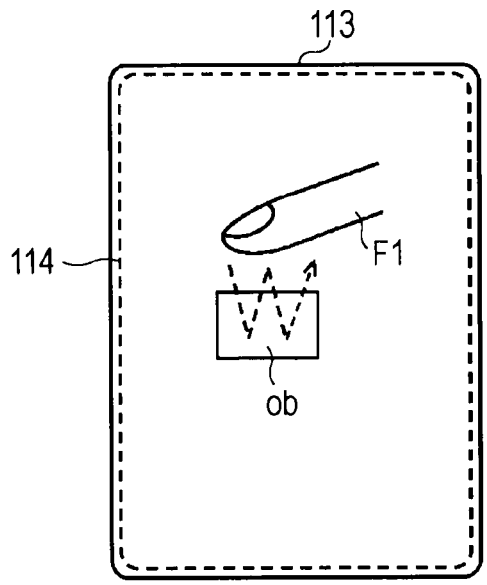
FIG. 6 illustrates another example of the process of selecting a display object using a double tap operation.
Figure 7:
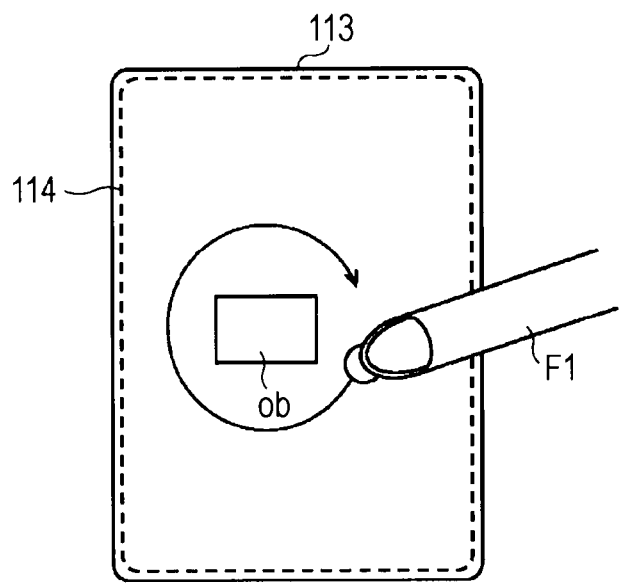
FIG. 7 illustrates another example of the process of selecting a display object using a drag operation.

While the forgoing embodiment has been described with reference to a pinch-in operation for selecting a display object, the operation for selecting a display object is not limited thereto. FIGS. 6 and 7 illustrate other examples of a selection operation of a display object. In FIG. 6, a display object is selected through a double tap operation. In FIG. 7, a display object is selected through a drag operation.

As shown in FIG. 6, the display object ob, such as a still image (a photo), displayed on the display screen of the LCD 113 is enlarged. In such a case, as indicated by a dotted arrow in FIG. 6, a tap operation is performed, twice in quick succession, on the operation surface of the touch panel 114 at a position at which the display object ob is displayed using a pointing device, such as a finger of a user. In this way, the display object to be enlarged is selected through the double tap operation.

After the display object to be enlarged is selected in this manner, the selected display object can be enlarged in the same manner as illustrated in FIGS. 3A and 3B, FIGS. 4A to 4C, and FIG. 5.

That is, the CPU 130 can enlarge the display object ob by a factor proportional to the distance between the pointing device, such as a finger of a user, used for the double tap operation and the operation surface of the touch panel 114 (i.e., the distance detected by the proximity sensor 128).

In addition, as shown in FIG. 7, the display object ob, such as a still image (a photo), displayed on the display screen of the LCD 113 is enlarged. In such a case, as indicated by a solid arrow in FIG. 7, the user performs a drag operation in which the user places a pointing device (e.g., their finger) on the operation surface of the touch panel 114 and moves the pointing device so as to encircle the display object ob.

In this way, in such a case, the display object ob to be enlarged is selected by the drag operation in which the user moves the pointing device so as to surround the display object ob on the operation surface of the touch panel 114.

That is, the CPU 130 can identify an area inside the trace of dragging using coordinate information received from the touch panel 114 and, subsequently, identify the display object ob displayed in the area as a display object to be enlarged.

After the display object to be enlarged is selected in this manner, the selected display object can be enlarged in the same manner as illustrated in FIGS. 3A and 3B, FIGS. 4A to 4C, and FIG. 5.

That is, the CPU 130 can enlarge the display object ob by a factor proportional to the distance between the pointing device, such as a finger of a user, used for the double tap operation and the operation surface of the touch panel 114 (i.e., the distance detected by the proximity sensor 128).

As described above, the desired display object can be selected through a variety of operations, such as a double tap operation or a drag operation to encircle the desired display object, in addition to the pinch-in operation.

[Process Performed when Display Object is Selected Through Operation Other than Multi-Touch Operation]

An exemplary process of selecting a display object to be enlarged when, as illustrated in FIGS. 6 and 7, the selecting operation is not a multi-touch operation is described next with reference to a flowchart shown in FIG. 8.

Figure 8:
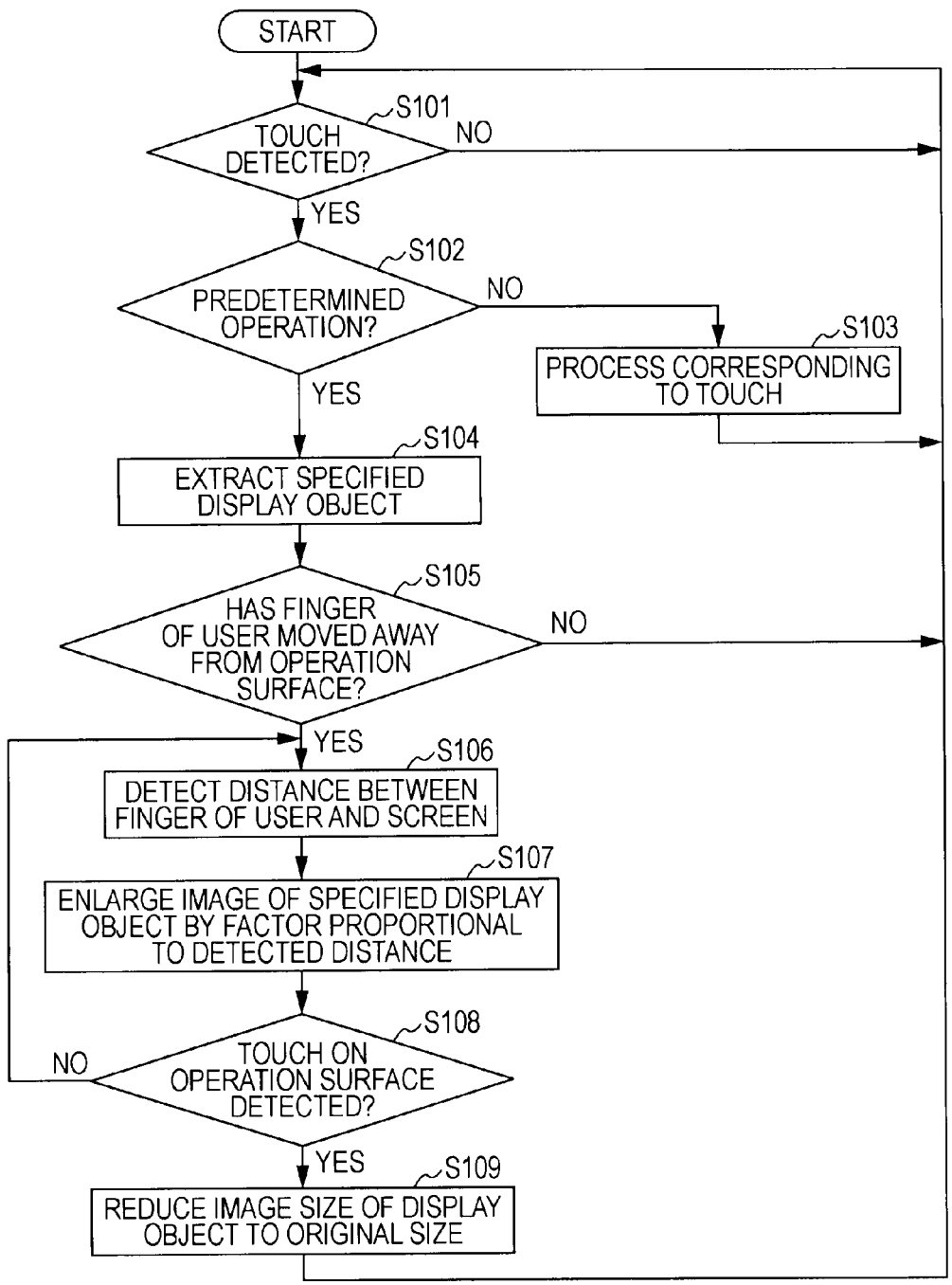
FIG. 8 is a flowchart illustrating the processes of selecting a target display object and enlarging the image of the display object through an operation other than a multi-touch operation.

FIG. 8 is a flowchart illustrating an exemplary process of selecting a display object to be enlarged when the operation is not a multi-touch operation. Like the process illustrated in FIG. 5, the process illustrated in FIG. 8 is performed by mainly the CPU 130 after the cell phone 100 is turned on and the LCD 113 enters an information displayable mode.

When the cell phone 100 is turned on and the LCD 113 enters an information displayable mode, the CPU 130 monitors the detection output of the touch panel 114. Thus, the CPU 130 can determine whether a touch operation (a contact operation) on the operation surface of the touch panel 114 is detected (step S101).

If, in step S101, it is determined that a touch operation on the operation surface of the touch panel 114 has not been detected, the process in step S101 is repeated. In this way, the process in step S101 is repeated until a touch operation on the operation surface of the touch panel 114 is detected. At that time, the CPU 130 is in a wait mode until a touch operation on the operation surface of the touch panel 114 is detected.

However, if, in step S101, it is determined that a touch operation on the operation surface of the touch panel 114 has been detected, the CPU 130 determines whether a predetermined operation for selecting a display object is performed on the operation surface of the touch panel 114 (step S102).

That is, in step S102, it is determined whether, as illustrated in FIG. 6 or 7, a predetermined operation for selecting a display object (e.g., a double tap operation or a drag operation) has been performed. In addition, the determination process in step S102 can be performed using the coordinate information received from the touch panel 114, as illustrated in FIG. 6 or 7.

If, in step S102, it is determined that a predetermined operation for selecting a display object has not been performed, the CPU 130 performs processing corresponding to the touch operation (step S103). Subsequently, the process in step S101 is repeated.

However, if, in step S102, it is determined that a predetermined operation for selecting a display object has been performed, the CPU 130 extracts (identifies) a display object selected through the predetermined operation (step S104).

That is, in step S104, the CPU 130 identifies a specified position on the operation surface of the touch panel 114 using the coordinate information received from the touch panel 114 and identifies a display object displayed on the LCD 113 at a position corresponding to the specified position.

Subsequently, the CPU 130 determines whether, for example, the finger of the user used for performing the predetermined operation for selecting a display object moves away from the operation surface of the touch panel 114 using the detection output of the proximity sensor 128 (step S105).

If, in step S105, it is determined that the finger of the user remains placed on the operation surface of the touch panel 114, the CPU 130 repeats the process in step S101.

That is, when the finger of the user remains placed on the operation surface of the touch panel 114, an instruction to enlarge the image of the selected display object ob has not been received. Accordingly, if the finger of the user remains placed on the operation surface of the touch panel 114 after a predetermined period of time (e.g., several seconds) has elapsed, the CPU 130 does not perform any process on the selected display object ob and repeats the process in step S101.

However, if, in step S105, it is determined that the finger of the user has moved away from the operation surface of the touch panel 114, the CPU 130 detects the position of the finger of the user relative to the operation surface of the touch panel 114 using the detection output of the proximity sensor 128 (step S106). That is, the CPU 130 detects the distance between the finger of the user and the operation surface of the touch panel 114.

Subsequently, the CPU 130 enlarges the display object extracted in step S104 by a factor proportional to the distance detected in step S106 (step S107).

Subsequently, the CPU 130 determines whether the finger of the user has been placed on the operation surface of the touch panel 114 again using the detection output of the touch panel 114 (step S108). If, in step S108, it is determined that the finger of the user has not been placed on the operation surface of the touch panel 114 again, the process in step S106 is repeated. That is, the process of enlarging the display object by a factor proportional to the distance between the finger of the user and the operation surface of the touch panel 114 and displaying the display object is repeated.

However, if, in step S108, it is determined that the finger of the user has been placed on the operation surface of the touch panel 114 again, the CPU 130 determines that the process of enlarging the extracted display object is completed. Thus, the CPU 130 reduces the size of the enlarged display object to the original size and displays the display object (step S109). Thereafter, the CPU 130 repeats the process in step S101.

In this way, according to the present embodiment, the cell phone 100 determines an operation for selecting a display object to be enlarged in advance. Thus, a display object to be enlarged and displayed can be selected through the predetermined operation (a particular operation).

Subsequently, when a finger used for the predetermined operation is moved away from the operation surface of the touch panel 114, the cell phone 100 can enlarge the selected display object by a factor proportional to the distance between the finger of the user and the operation surface of the touch panel 114.

[Layout of Proximity Sensor]

The layout of the proximity sensor 128 in the cell phone 100 according to the present embodiment is described next. In the cell phone 100, the detection area for detecting a pointing device (e.g., a finger of the user) varies in accordance with a position at which the proximity sensor 128 is disposed and the number of the proximity sensors. Thus, detectable user operations are different.

Figure 9A:
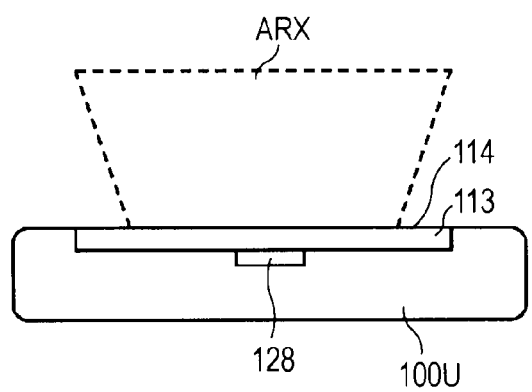
FIGS. 9A and 9B illustrate the layout of proximity sensors and the number of the proximity sensors.
Figure 9B:
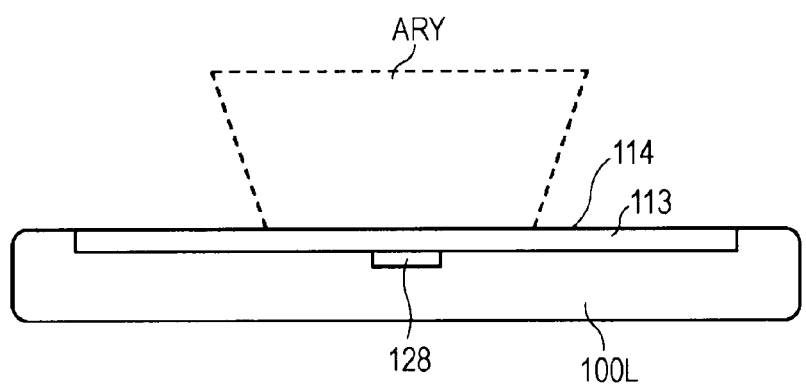

FIGS. 9A and 9B and FIGS. 10 to 14 illustrate the position at which the proximity sensor 128 is disposed and the number of the proximity sensors. Note that like the above-described example, FIGS. 9A and 9B illustrate an example in which the proximity sensor 128 is disposed in a lower layer portion of the touch panel 114 (on the back side of the touch panel 114) at the center of the operation surface of the touch panel 114.

For example, as indicated by a dotted line shown in FIG. 9A, when viewed from a top surface 100U of the cell phone 100, a sensing area ARX having a relatively long length in the width (short edge) direction of the operation surface of the touch panel 114 can be provided by the proximity sensor 128.

In addition, as indicated by a dotted line shown in FIG. 9B, when viewed from a left side surface 100L of the cell phone 100, a sensing area ARY in the length direction (the long edge direction) of the operation surface of the touch panel 114 can be provided by the proximity sensor 128.

In such a case, in practice, a sensing range (ARX, ARY) over the operation surface of the touch panel 114 (i.e., over the display screen of the LCD 113) is sufficiently large for detecting the distance between a finger of the user and the operation surface of the touch panel 114.

However, as shown in FIG. 9B, the end portions of the operation surface of the touch panel 114 in the vertical direction (an upper end portion and a lower end portion) may be outside the sensing range of the proximity sensor 128 if the performance of the proximity sensor 128 is not so high. To solve such a problem, a plurality of the proximity sensors 128 can be disposed.

Figure 10:
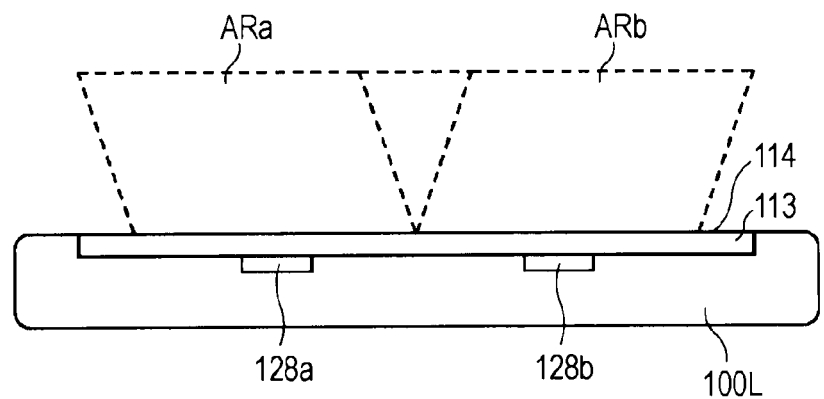
FIG. 10 illustrates the layout of proximity sensors and the number of the proximity sensors.
Figure 11:
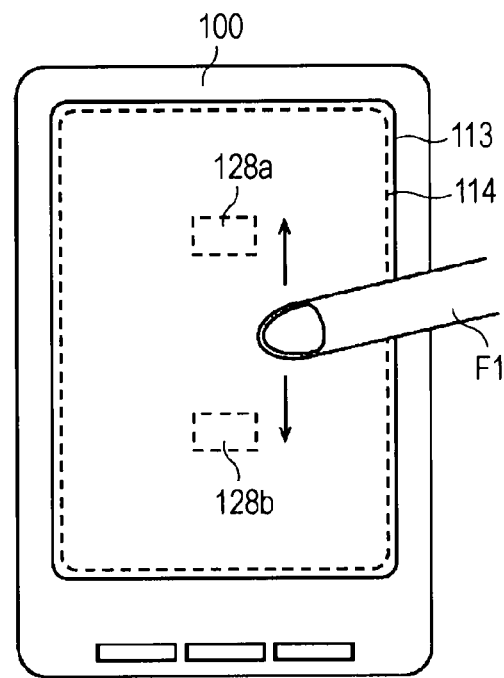
FIG. 11 illustrates the layout of proximity sensors and the number of the proximity sensors.

FIGS. 10 and 11 illustrate examples in which two proximity sensors 128a and 128b are disposed in the cell phone 100. In the example shown in FIG. 10, the proximity sensors 128a and 128b are disposed on the back surface of the touch panel 114 of the cell phone 100 so as to be arranged in the vertical length direction (the long edge direction) of the operation surface of the touch panel 114. Note that each of the proximity sensors 128a and 128b is disposed in the middle of the operation surface of the touch panel 114 in the horizontal width direction (the short edge direction).

In this way, when viewed from the top surface 100U of the cell phone 100, as shown in FIG. 9A, the sensing area ARX that is relatively long in the horizontal width direction (the short edge direction) of the operation surface of the touch panel 114 can be provided.

In addition, when viewed from the left side surface 100L of the cell phone 100, as shown in FIG. 10, a sensing area ARa of the proximity sensor 128a and a sensing area ARb of the proximity sensor 128b are provided in the vertical length direction (the long edge direction) of the operation surface of the touch panel 114. Thus, a sensing range of the proximity sensors can be provided over almost the entirety of the operation surface of the touch panel 114.

In addition, when two proximity sensors 128a and 128b are used as shown in FIG. 10, movement of the pointing device (e.g., a finger of the user) away from the operation surface of the touch panel 114 in the horizontal direction can be detected in addition to the distance between the pointing device and the operation surface of the touch panel 114.

That is, as shown in FIG. 11, the proximity sensors 128a and 128b are disposed on the back side of the operation surface of the touch panel 114. In such a case, as indicated by an arrow shown in FIG. 11, the motion (the movement) of the pointing device (e.g., a finger of the user) that is not in contact with the operation surface of the touch panel 114 in the upward direction and the downward direction can be detected.

When, in FIG. 11, the finger F1 is moved in a direction indicated by an up-arrow, the distance indicated by the detection output of the proximity sensor 128a (the distance between the finger F1 of the user and the proximity sensor 128a) decreases. In contrast, the distance indicated by the detection output of the proximity sensor 128b (the distance between the finger F1 of the user and the proximity sensor 128b) increases. Accordingly, the CPU 130 can detect that the finger F1 of the user is moving in the direction indicated by the up-arrow.

Similarly, when the finger F1 is moved in a direction indicated by a down-arrow, the distance indicated by the detection output of the proximity sensor 128a increases. In contrast, the distance indicated by the detection output of the proximity sensor 128b decreases. Accordingly, the CPU 130 can detect that the finger F1 of the user is moving in the direction indicated by the down-arrow.

In addition, as described above, when the pointing device, such as a finger of the user, is not in contact with the operation surface of the touch panel 114, movement of the pointing device away from the operation surface of the touch panel 114 in the perpendicular direction is considered to be an instruction to enlarge a selected display object.

Furthermore, when the pointing device, such as a finger of the user, is not in contact with the operation surface of the touch panel 114, movement of the pointing device above the operation surface of the touch panel 114 in the horizontal direction is considered to be, for example, an instruction to change the position at which the selected display object is displayed.

In this way, according to the present embodiment, a plurality of proximity sensors are disposed in the cell phone 100. Thus, after the pointing device, such as a finger of the user, is moved away from the operation surface of the touch panel 114 by a predetermined distance or more, the cell phone 100 can further recognize a gesture (an operation) performed by the user above the display screen and perform an additional process corresponding to the gesture.

FIGS. 12A and 12B and FIGS. 13 and 14 illustrate examples when the cell phone 100 includes four proximity sensors 128a, 128b, 128c, and 128d. In the example shown in FIGS. 12A and 12B, the proximity sensors 128a, 128b, 128c, and 128d are disposed on the back of the touch panel 114 of the cell phone 100 at four corners of the touch panel 114.

Figure 12A:
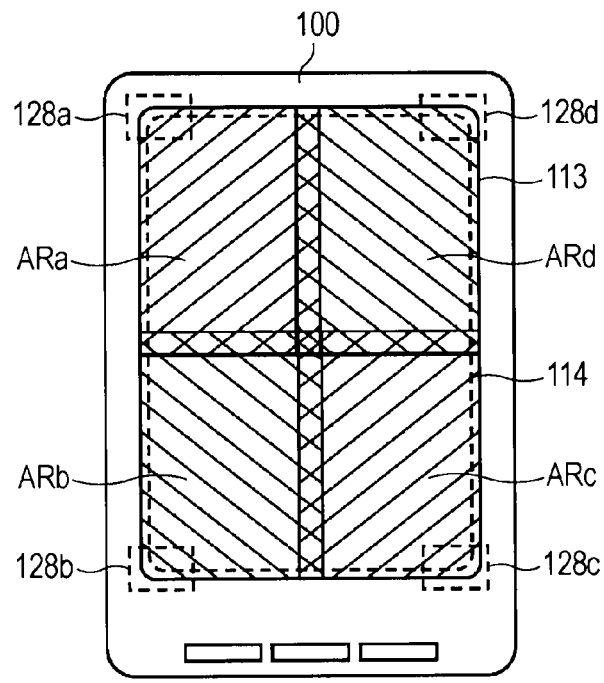
FIGS. 12A and 12B illustrate the layout of proximity sensors and the number of the proximity sensors.
Figure 12B:
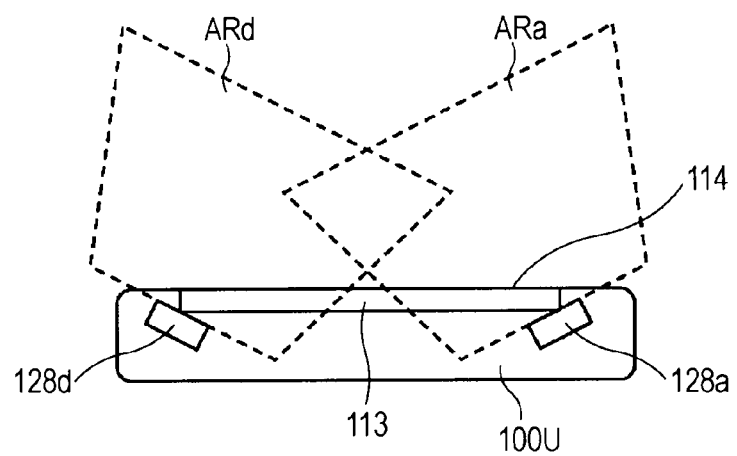

Accordingly, as shown in FIGS. 12A and 12B, a sensing area ARa of the proximity sensor 128a is formed at the upper left portion of the operation surface of the touch panel 114 of the cell phone 100. In addition, a sensing area ARb of the proximity sensor 128b is formed at the lower left portion of the operation surface of the touch panel 114 of the cell phone 100.

Similarly, as shown in FIGS. 12A and 12B, a sensing area ARc of the proximity sensor 128c is formed at the lower right portion of the operation surface of the touch panel 114 of the cell phone 100. In addition, a sensing area ARd of the proximity sensor 128d is formed at the upper right portion of the operation surface of the touch panel 114 of the cell phone 100.

Note that each of the sensing areas formed by the proximity sensors 128a, 128b, 128c, and 128d overlaps with the sensing area of the neighboring proximity sensor in the boundary portion thereof.

In this way, the entirety of the space above the operation surface of the touch panel 114 is covered by the sensing areas of the proximity sensors. Note that, like the sensing areas indicated by the dotted lines in FIGS. 9A and 9B and FIG. 10, the sensing area having a predetermined height from the operation surface of the touch panel 114 is formed over the operation surface of the touch panel 114.

That is, each of the sensing areas ARa, ARb, ARc, and ARd formed by the proximity sensors 128a, 128b, 128c, and 128d, respectively, is three-dimensional (solid), not two-dimensional (planar).

In addition, as shown in FIG. 12B, each of the proximity sensors 128a, 128b, 128c, and 128d is disposed so as to be slightly at an angle toward the center of the operation surface of the touch panel 114. In this way, as indicated by a dotted line in FIG. 12B, a relatively wide sensing area can be efficiently formed over the operation surface of the touch panel 114.

Furthermore, as shown in FIG. 12A, the distance between the pointing device (e.g., a finger of the user) and the operation surface of the touch panel 114 can be detected by using the four proximity sensors 128a, 128b, 128c, and 128d. Consequently, even complicated movement of the pointing device (e.g., a finger of the user) can be detected using the detection outputs of the four proximity sensors 128a, 128b, 128c, and 128d.

Figure 13:
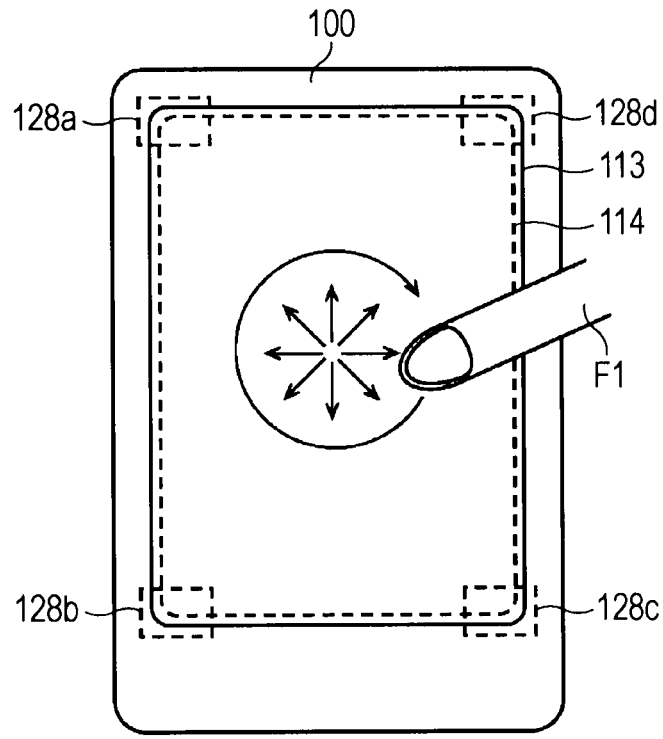
FIG. 13 illustrates the layout of proximity sensors and the number of the proximity sensors.

FIG. 13 illustrates the motion of the finger F1 detectable when the finger F1 is not in contact with the operation surface of the touch panel 114. Since the proximity sensors 128a, 128b, 128c, and 128d are disposed at the four corners of the operation surface of the touch panel 114, a variety of motions of the pointing device, such as a motion in any direction and an encircling motion as indicated by arrows in FIG. 13, can be detected in addition to a motion in the vertical direction.

In this way, the cell phone 100 can move the selected display object to any point of the display screen of the LCD 113 in addition to enlarging the display object.

Figure 14:
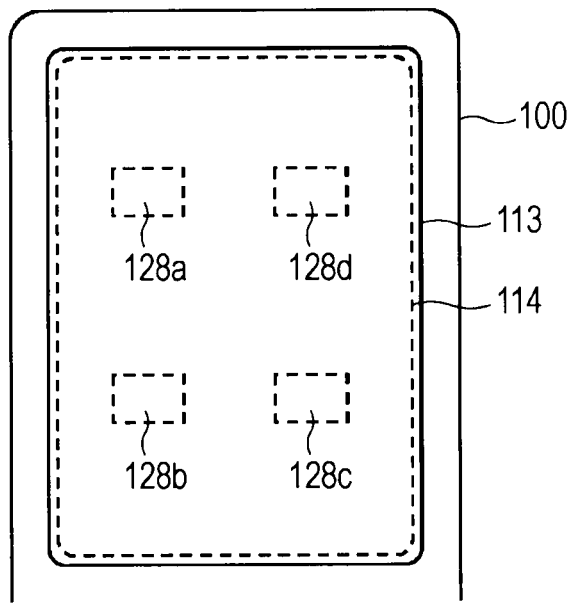
FIG. 14 illustrates the layout of proximity sensors and the number of the proximity sensors.

Note that in FIGS. 12A and 12B and FIG. 13, the proximity sensors 128a, 128b, 128c, and 128d are disposed in the four corners of the operation surface of the touch panel 114. However, the layout of the proximity sensors 128a, 128b, 128c, and 128d are not limited thereto. For example, as shown in FIG. 14, the proximity sensors 128a, 128b, 128c, and 128d may be disposed at the centers of four areas formed by bisecting the operation surface of the touch panel 114 in the length direction and bisecting the operation surface in the width direction.

In addition, the layout and the number of proximity sensors are not limited to those described above. One or more proximity sensors can be disposed at any positions of the cell phone 100. For example, three proximity sensors may be disposed on the back side of the touch panel 114 in a triangle. Alternatively, any number of proximity sensors may be disposed in the periphery of the front surface of the cell phone 100 at any positions.

As described above, the layout and the number of proximity sensors can be freely determined in accordance with, for example, the sensitivities of the proximity sensors.

[Summary of Operation Performed by Cell Phone Including Plurality of Proximity Sensors]

The processes performed by the cell phone 100 including a plurality of proximity sensors as illustrated in FIGS. 10 to 14 are summarized below with reference to a flowchart shown in FIG. 15. FIG. 15 is a flowchart illustrating a process performed on a display object by the cell phone 100 including a plurality of proximity sensors.

As in the processes of the flowchart illustrated in FIG. 5, in the processes of the flowchart shown in FIG. 15, a pinch-in operation is used for selecting a display object. In addition, like the processes of the flowchart illustrated in FIG. 5, the processes of the flowchart shown in FIG. 15 are performed mainly by the CPU 130 after the cell phone 100 is turned on and the cell phone 100 enters a displayable mode of information on the LCD 113.

In the processes of the flowchart shown in FIG. 15, the steps that are the same as those of the flowchart shown in FIG. 5 are designated by the same reference numerals, and descriptions thereof are not repeated. That is, in the flowchart shown in FIG. 15, steps S1 to S8 in which the processes corresponding to the operation input to the operation surface of the touch panel 114 are performed are the same as those in the flowchart shown in FIG. 5.

However, in the processes shown in FIG. 15, the process performed after a pinch-in operation has been performed on the operation surface of the touch panel 114 and it has been determined in step S7 that the fingers of the user used for the pinch-in operation have moved away from the operation surface of the touch panel 114, differs from the process shown in FIG. 5.

That is, if, in step S7, it is determined that the finger of the user is moved away from the operation surface of the touch panel 114, the CPU 130 detects the motion of the fingers of the user used for the pinch-in operation using the detection outputs of a plurality of proximity sensors 128a and 128b (step S21). That is, in step S21, movements of the fingers of the user relative to the operation surface of the touch panel 114 in the vertical direction and the horizontal direction are detected.

Thereafter, the CPU 130 performs processing regarding a display object selected through the pinch-in operation that was performed by the fingers of the user and that was detected in step S21 (step S22).

Accordingly, when the finger of the user has moved in the direction that is perpendicular to the operation surface of the touch panel 114, an enlargement process of the display object by a factor proportional to the distance between the finger of the user and the operation surface of the touch panel 114 is performed. In addition, when the finger of the user has moved in the horizontal direction of the operation surface of the touch panel 114, the position at which the display object is displayed is changed.

Note that if the finger of the user has moved from the operation surface of the touch panel 114 (the display screen of the LCD 113) in the perpendicular direction and has moved in the horizontal direction, the CPU 130 performs the enlargement process and the position change process of the display object at the same time.

Subsequently, the CPU 130 determines whether the finger of the user is placed on the operation surface of the touch panel 114 again using the detection output of the touch panel 114 (step S23). If, in step S23, it is determined that the finger of the user is not placed on the operation surface of the touch panel 114, the CPU 130 repeats the process in step S21. That is, the processing on the display object in accordance with the motion of the finger of the user (the enlargement process and the position change process) is repeated.

However, if, in step S23, it is determined that the finger of the user is placed on the operation surface of the touch panel 114 again, the CPU 130 completes the processing on the display object (step S24). Thereafter, the CPU 130 repeats the process in step S1.

Note that, in step S24, the process in step S1 may be repeated after the size of the selected display object is reduced to the original size and the display position of the selected display object is returned to the original position. In addition, the enlargement process and the position change process may be completed while maintaining the display position and the size of the display object when the finger is placed on the operation surface of the touch panel 114 again. Subsequently, the process in step S1 may be repeated.

As described above, by disposing a plurality of proximity sensors in the cell phone 100, movement of a pointing device (e.g., a finger of the user) relative to the operation surface of the touch panel 114 in the perpendicular direction and the horizontal direction can be detected. Thereafter, the processing can be performed on the selected display object in accordance with the movement of the pointing device (e.g., finger of the user) in the perpendicular direction and the horizontal direction. Accordingly, a three-dimensional operation can be more flexibly input and a more intuitive operation input method can be provided to the user.

[Application of Three-Dimensional Operation Input]

In the above-described embodiment, the desired display object is enlarged in accordance with the movement of a pointing device, such as a finger of the user, relative to the operation surface of the touch panel 114 in the perpendicular direction. In addition, the displayed position of the desired display object is moved in accordance with the movement of a pointing device, such as a finger of the user, relative to the operation surface of the touch panel 114 in the horizontal direction.

However, a method for enlarging the display object and moving the displayed position of the display object is not limited thereto. The cell phone 100 can perform a variety of processes with the movement of a pointing device, such as a finger of the user, relative to the operation surface of the touch panel 114 in the perpendicular direction and the horizontal direction.

Figure 16A:
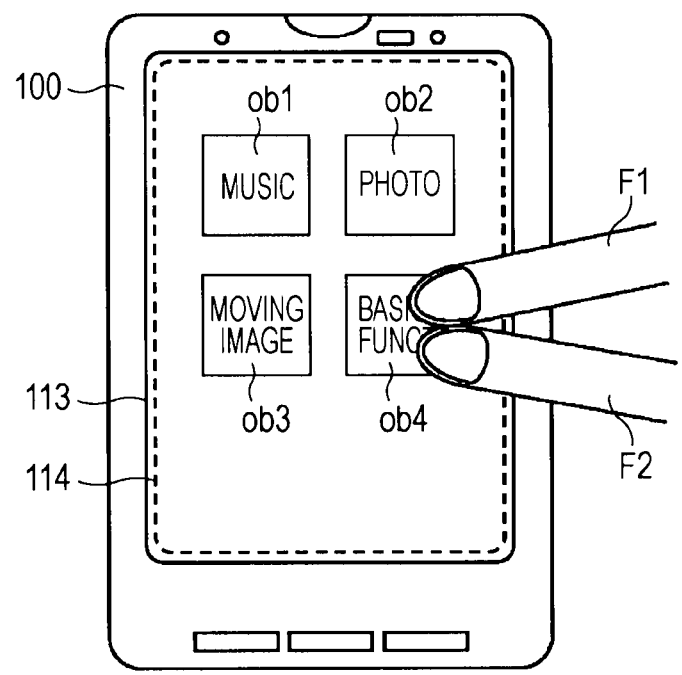
FIGS. 16A and 16B illustrate predetermined processes performed in accordance with movement of a pointing device, such as a finger of a user, in the perpendicular direction and the horizontal direction of a display screen.
Figure 16B:
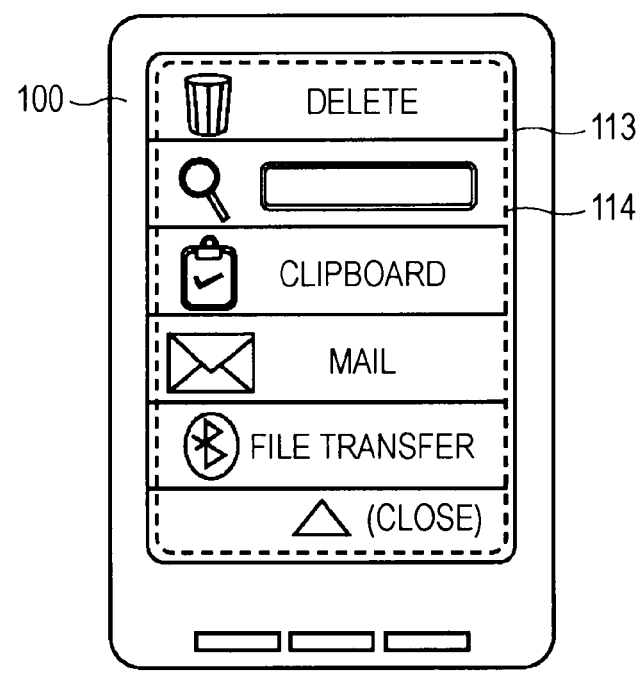

FIGS. 16A and 16B and FIG. 17 illustrate an example in which a predetermined process is performed in accordance with movement of a pointing device, such as a finger of the user, relative to the operation surface of the touch panel 114 in the perpendicular direction and the horizontal direction.

In FIGS. 16A and 16B and FIG. 17, like the above-described embodiment, a display object displayed on the display screen of the LCD 113 is selected through a multi-touch pinch-in operation (a gesture operation).

However, in the example shown in FIGS. 16A and 16B and FIG. 17, if a finger of the user is moved away from the display screen by a predetermined distance or more in the vertical direction after a display object is selected, an operation list screen (an operation menu) corresponding to the type of the selected display object is displayed on the display screen.

The cell phone 100 shown in this example also has the configuration shown in FIG. 1. In addition, as shown in FIG. 16A, a plurality of display objects used for starting various functions that are executable in the cell phone 100 are displayed on the display screen of the LCD 113.

In the example shown in FIG. 16A, four display objects ob1, ob2, ob3, and ob4 are displayed. The display object ob1 is used for starting a process regarding retrieving and playing back music data. The display object ob2 is used for retrieving and playing back photo data (still image data). Note that retrieving photo data includes capturing the image of a subject. The display object ob3 is used for retrieving and playing back moving image data. Note that retrieving photo data includes capturing the moving image of a subject. The display object ob4 is used for starting a basic function.

In this example, a multi-touch operation is performed on the operation surface of the touch panel 114 by a user so that the user pinches the display object ob4. That is, as shown in FIG. 16A, a pinch-in operation is performed using the fingers F1 and F2 of the user in order to select the display object ob4.

Subsequently, if the CPU 130 detects that the fingers F1 and F2 of the user used for the pinch-in operation are moved away from the operation surface of the touch panel 114 by a predetermined distance or more using the proximity sensor 128, the CPU 130 displays an operation list screen (an operation menu) regarding the display object ob4.

At that time, the CPU 130 reads display data stored in, for example, the ROM 109 and supplies the readout display data to the external memory 122. In addition, the CPU 130 controls the display control unit 112 so that the operation list screen (the operation menu) is displayed on the display screen of the LCD 113.

Since the display object ob4 of this example is related to the basic function of the cell phone 100, an operation list screen regarding the basic function shown in FIG. 16B is displayed. Note that the operation list screen shown in FIG. 16B includes the following selection items from the top end of the display screen of the LCD 113: "Trash Can (delete)", "Internet Search Window", "Clipboard", "Mail", "File Transfer", and "Close".

The selection item "Trash Can (DELETE)" is used for deleting a content data item, such as a music data item, a moving image data item, or a still image data item from the memory of the cell phone 100. The selection item "Internet Search Window" is used for text search (characters search). In addition, the selection item "CLIPBOARD" is used for copying text data or content data using a shared memory area.

Furthermore, the selection item "MAIL" is used for sending or receiving a text data item or a content data item, such as a music data item, a moving image data item, or a still image data item in the form of an e-mail. Note that the functions started using the selection item "MAIL" include a variety of functions regarding an e-mail, such as generating an e-mail, sending and receiving an e-mail, and displaying a received e-mail.

In addition, the selection item "FILE TRANSFER" is used for transmitting and receiving a text data item or a content data item, such as a music data item, a moving image data item, or a still image data item using close range wireless communication, such as Bluetooth. The lowermost selection item "CLOSE" is used to stop displaying the operation list screen (the operation menu) and displaying, for example, the screen shown in FIG. 16A.

In this example, as shown in FIG. 16A, the display object ob4 regarding the basic function is selected. However, even when another display object is selected, an operation list screen corresponding to the selected display object can be displayed.

For example, when the display object ob1 is selected through a pinch-in operation and if a finger of the user used for the pinch-in operation is moved away from the operation surface of the touch panel 114 by a predetermined distance or more, an operation list screen used for acquiring and playing back a music data item is displayed.

Similarly, when the display object ob2 is selected, an operation list screen used for acquiring (capturing) and playing back a photo data item (a still image) is displayed. Alternatively, when the display object ob3 is selected, an operation list screen used for acquiring (capturing) and playing back a moving image data item is displayed.

Note that while a pinch-in operation is used for selecting a desired display object in this example, an operation for selecting a desired display object is not limited thereto. As described above, in order to select a desired display object, a predetermined operation, such as a double tap operation or a drag operation, can be employed.

In addition, as illustrated in FIGS. 16A and 16B, in order to select a desired display object and display an operation list screen regarding the selected display object, the single proximity sensor 128 disposed on the back side of the touch panel 114 as shown in FIGS. 4A to 4C and FIGS. 9A and 9B is sufficient.

However, as shown in FIGS. 10 and 11, by disposing at least two proximity sensors on the back side of the touch panel 114, movement of the finger of the user in the vertical length direction (the long edge direction) of the operation surface of the touch panel 114 can be detected.

In such a case, one of the selection items can be selected by movement of a finger of the user in the vertical length direction (the long edge direction) of the operation surface of the touch panel 114. At that time, the finger is not in contact with the operation surface of the touch panel 114.

In addition, if all of the selection items are not displayed in one screen, the selection items can be scrolled by movement of a finger of the user in the vertical length direction (the long edge direction) of the operation surface of the touch panel 114. At that time, the finger is not in contact with the operation surface of the touch panel 114.

In this way, a cursor is placed on a desired selection item by the user moving their finger which is spaced away from the operation surface of the touch panel 114, in the vertical length direction (the long edge direction) of the operation surface of the touch panel 114. Thereafter, by further moving the finger in a direction in which the finger moves away from the operation surface of the touch panel 114 (the perpendicular direction), the selection item can be selected.

Thus, a variety of processes can be performed in accordance with the motion of a finger of the user above the operation surface of the touch panel 114 detected by the proximity sensor 128 in addition to a touch of the finger on the operation surface of the touch panel 114.

[Summary of Operation Performed by Cell Phone Illustrated in FIGS. 16A and 16B]

The process performed by the cell phone 100 when the cell phone 100 displays the operation list screen shown in FIGS. 16A and 16B is summarized below with reference to FIG. 17. FIG. 17 is a flowchart illustrating a process performed by the cell phone 100 when a display object is selected and an operation list screen (an operation menu) regarding the selected display object is displayed.

As in the processes of the flowchart illustrated in FIG. 5, in the processes of the flowchart illustrated in FIG. 17, a pinch-in operation is used for selecting a display object. In addition, the flowchart illustrated in FIG. 17 represents a process performed when a plurality of display objects corresponding to the functions of the cell phone 100 are displayed, as shown in FIG. 16A.

In the processes of the flowchart shown in FIG. 17, the steps that are the same as those of the flowchart shown in FIG. 5 are designated by the same reference numerals, and descriptions thereof are not repeated.

That is, in the flowchart shown in FIG. 17, steps S1 to S8 in which the processes corresponding to the operation input to the operation surface of the touch panel 114 are performed are the same as those in the flowchart shown in FIG. 5.

However, in the processes shown in FIG. 17, the process performed after a pinch-in operation has been performed on the operation surface of the touch panel 114 and it has been determined in step S7 that the fingers of the user used for the pinch-in operation have moved away from the operation surface of the touch panel 114, differs from the process shown in FIG. 5.

That is, if, in step S7, it is determined that the finger of the user is moved away from the operation surface of the touch panel 114, the CPU 130 detects the motion of the fingers of the user used for the pinch-in operation using the detection outputs of a plurality of proximity sensors 128a and 128b (step S31). That is, in step S31, movements of the fingers of the user with respect to the operation surface of the touch panel 114 in the perpendicular direction and the horizontal direction are detected.

Thereafter, the CPU 130 performs processing regarding a display object selected through the pinch-in operation that was performed by the fingers of the user and that was detected in step S31 (step S32).

In step S32, when the CPU 130 detects, using the detection outputs of the proximity sensors 128a and 128b, that the finger of the user has moved away from the operation surface of the touch panel 114 in the perpendicular direction by a predetermined distance or more, the CPU 130 displays an operation list screen.

More specifically, the CPU 130 reads display information necessary for displaying a desired operation list screen from the ROM 109 and supplies the display information to the display control unit 112. Thereafter, the CPU 130 controls the display control unit 112 so that the operation list screen shown in FIG. 16B is displayed on the display screen of the LCD 113.

In addition, in step S32, if the CPU 130 detects that the finger of the user has moved away from the operation surface of the touch panel 114 in the perpendicular direction using the detection outputs of the proximity sensors 128a and 128b after the operation list screen was displayed, the CPU 130 performs a process of selecting one of the selection items.

That is, using the detection outputs of the proximity sensors 128a and 128b, the CPU 130 detects a direction in which the finger of the user moves and sequentially changes a selection item on which a cursor is placed in accordance with the detected direction.

Subsequently, using the detection outputs of the proximity sensors 128a and 128b or the detection output of the touch panel 114, the CPU 130 determines whether an operation to select a desired selection item from the displayed operation list screen has been performed (step S33).

If, in step S33, it is determined that an operation to select a desired selection item has not been performed, the CPU 130 repeats the process in step S31. That is, when an operation list screen is not displayed, the operation list screen is displayed. In contrast, when the operation list screen is displayed, a process for selecting a selection item is performed.

However, if, in step S33, it is determined that an operation to select a desired selection item has been performed, the CPU 130 displays an image corresponding to the selection item (step S34). Thereafter, the process in step S1 is repeated.

In this case, in step S34, the CPU 130 reads necessary display information from the ROM 109 and supplies the readout display information to the display control unit 112. Thereafter, the CPU 130 controls the display control unit 112 so that the image corresponding to the selected selection item is displayed on the display screen of the LCD 113. Subsequently, the process in step S1 is repeated in order to receive an operation input for the displayed image.

Note that in the example shown in FIG. 16B, "CLOSE" displayed at the lowermost position is one of the selection items. If the selection item "CLOSE" is selected, the screen shown in FIG. 16A is displayed again, as described above. Thus, an operation input from the user can be received.

In this way, an operation list screen corresponding to the desired display object can be displayed. From the operation list screen, a selection item for starting a desired process can be selected. Thus, the desired process can be performed.

[Modifications]

While the foregoing embodiment has been described with reference to the case in which enlargement of a display object or a process of displaying another screen regarding a display object (an operation list screen (an operation menu)) is performed in accordance with the position of a pointing device, such as a finger of the user, relative to the operation surface of the touch panel 114, the application is not limited thereto.

For example, a variety of control processes can be performed using a touch operation on the operation surface of the touch panel 114. For example, an item to be controlled, such as sound volume, a tone, or the brightness of the display screen, is selected. Thereafter, the selected item can be controlled using the movement of the pointing device (e.g., a finger of the user) that is placed above the operation surface of the touch panel 114 and is detected by a proximity sensor.

For example, by instructing volume control and moving a pointing device (e.g., a finger of the user) that is not in contact with the operation surface of the touch panel 114 in the vertical length direction (the long edge direction) of the operation surface of the touch panel 114, the sound volume can be controlled. Alternatively, as illustrated in FIG. 13, by moving a pointing device, such as a finger, in a clockwise direction above the operation surface of the touch panel 114, the volume can be increased. In contrast, by moving the pointing device in a counterclockwise direction, the volume can be decreased.

In a similar manner, in order to control a tone, after selecting a desired frequency range, the tone level of the frequency range can be increased or decreased. In addition, in a similar manner, the brightness of the display screen can be increased or decreased.

[Method Embodiments]

According to embodiments described herein, methods for receiving information are provided. The method is illustrated by the flowcharts shown in FIGS. 5, 8, 15, and 17.

More specifically, as a broader concept, the method includes the steps of receiving a touch instruction operation performed on the operation surface of the touch panel 114 by the user from the touch panel 114, where the operation surface is disposed over the display screen of the LCD 113, detecting coordinate information indicating the touched position on the operation surface, and outputting the coordinate information, detecting the position of a pointing device used for the touch instruction operation relative to the operation surface using the proximity sensor 128, and controlling the CPU 130 to perform a predetermined process in accordance with the received touch instruction operation and the detected position of the pointing device relative to the operation surface.

[Correspondence Between Features of Claims and Specific Elements Disclosed in Embodiments]

In the cell phone 100 according to the above-described embodiment, the touch panel 114 realizes the function of instructed position detecting means. The proximity sensor 128 realizes the function of sensor means. The CPU 130 mainly realizes the function of control means. In addition, the CPU 130 mainly realizes the function of determination means and the function of identifying means.

[Others]

While the foregoing embodiments have been described with reference to a cell phone, it is to be understood that the claimed invention is not limited to the embodiments using a cell phone. For example, the claimed invention may be applicable to a variety of electronic apparatuses that can include a touch panel and a proximity sensor and receive operation input from the user via the touch panel and the proximity sensor (e.g., mobile information terminals called "personal digital assistants", personal computers, and television receivers).

In addition, while the foregoing embodiments have been described with reference to a process in which a display object is enlarged and moved and an additional display screen corresponding to the display object is displayed, it is to be understood that the claimed invention is not limited thereto. For example, a variety of operation inputs are allowed by using a two-dimensional operation input to a touch panel and a three-dimensional operation input from a pointing device (e.g., a finger of the user) placed above the operation surface of the touch panel 114.

In particular, in recent years, information terminals including a relatively large display screen and a touch panel and realizing, for example, an electronic book reader function have been provided in addition to cell phones (e.g., smart phones). For example, the present embodiments allow the users of such information terminals to flip a displayed page without touching the touch panel.

In addition, while the foregoing embodiments have been described with reference to the proximity sensor 128 of an infrared type, it is to be understood that the type of the proximity sensor 128 is not limited thereto. Any high-precision proximity sensor, such as a proximity sensor of an electrostatic capacitance type, can be used.

Precisely speaking, the proximity sensor 128 detects the position of a pointing device, such as a finger of the user, relative to the proximity sensor 128 (the distance between the pointing device and the proximity sensor 128). However, according to the above-described embodiment, the proximity sensor 128 is disposed on the back side of the touch panel 114 and, therefore, for the sake of convenience, the position of the pointing device relative to the operation surface of the touch panel 114 is detected.

In addition, while the foregoing embodiments have been described with reference to an operation input using a finger of the user, a pointing device for the operation input is not limited thereto. A touch pen called a "stylus" can be used for the operation input. However, when a multi-touch operation is performed, the fingers of the user are used.

Furthermore, when the present embodiment is applied to a cell phone and if, for example, only the telephone function of the cell phone is being used, information displayed on the LCD is not used. Accordingly, a proximity sensor is provided and it is detected whether the cell phone is in contact with the head of the user using the proximity sensor. If the telephone function of the cell phone is being used, the LCD is turned off.

Therefore, when the present embodiment is applied to a cell phone and if the cell phone includes a proximity sensor for detecting the proximity of the face of the user, the position of a finger of the user relative to the operation surface of the touch panel may be detected using that proximity sensor.

In such a case, it is necessary to distinguish the head of the user from the pointing device (e.g., the finger of the user). Accordingly, by using a difference between the detection outputs of the proximity sensor when the proximity sensor detects the head and the finger of the user, the proximity sensor can determine whether the head or the finger of the user is in the proximity of the cell phone. Thus, a single proximity sensor can be used for detecting the head and the finger of the user.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a display device;
   pointed position detecting means for detecting a specified position by a touch operation of a pointing device on a screen of the display device;
   sensor means for detecting a position of the pointing device when the pointing device is not in contact with the screen of the display device; and
   control means for recognizing the touch operation detected by the pointed position detecting means and controlling the information processing apparatus in accordance with the recognized touch operation and the position of the pointing device detected by the sensor means,
   wherein the sensor means includes at least four sensor means each disposed at a position corresponding to a different quadrant or corner of the screen and each of the at least four sensor means is inclined at a non-zero angle with respect to the screen, and
   the sensor means recognizes a direction of movement of the pointing device when the pointing device is not in contact with the screen which includes at least recognizing a circular movement of the pointing device along a plane that is parallel with respect to the screen when the pointing device is not in contact with the screen.

2. The information processing apparatus according to claim 1, wherein the sensor means measures a distance between the screen and the pointing device.

3. The information processing apparatus according to claim 1, wherein the pointed position detecting means detects a multi-touch operation by a plurality of pointing devices which contact the screen at multiple locations.

4. The information processing apparatus according to claim 3, wherein the sensor means detects a position of the pointing devices when they are not in contact with the screen after the pointed position detecting means detects the multi-touch operation by the plurality of pointing devices on the screen and a pinched-in gesture by the plurality of pointing devices towards an object displayed on the screen.

5. The information processing apparatus according to claim 4, wherein the object displayed on the screen is enlarged when the sensor means detects that the pointing devices have moved away from contacting the screen following the pinched-in gesture.

6. The information processing apparatus according to claim 5, wherein the object is returned back to its original size when the pointed position detecting means detects a touch operation on the screen after the object has been enlarged.

7. The information processing apparatus according to claim 1, wherein the sensor means recognizes a movement of the pointing device in the horizontal direction and the vertical direction with respect to the screen when the pointing device is not in contact with the screen.

8. The information processing apparatus according to claim 1, wherein the pointed position detecting means detects that an object displayed on the screen is selected according to a touch operation on the screen.

9. The information processing apparatus according to claim 8, wherein the touch operation to select the object is a double-tap operation on the object by the pointing device.

10. The information processing apparatus according to claim 8, wherein the touch operation to select the object is a circular motion around the object by the pointing device.

11. The information processing apparatus according to claim 1, wherein the pointing device is a finger of a user.

12. The information processing apparatus according to claim 1, wherein the information processing apparatus is configured to receive an input of a selection of an item which has a varying output level on the information processing apparatus, and following the selection of the item, when the sensor means recognizes the circular movement of the pointing device along a plane that is parallel with respect to the screen when the pointing device is not in contact with the screen, the information processing apparatus is configured to change the output level of the selected item in accordance with the circular movement.

13. The information processing apparatus according to claim 12, wherein the information processing apparatus is configured to change the output level of the selected item in accordance with a direction of the circular movement in one of the clockwise and counterclockwise direction.

14. The information processing apparatus according to claim 12, wherein the item is one of brightness of the display device, sound volume, and tone.

15. An information processing method, implemented on an information processing apparatus having a display device, comprising:
   detecting a specified position by a touch operation of a pointing device on a screen of the display device;
   detecting, with a sensor unit, a position of the pointing device when the pointing device is not in contact with the screen of the display device; and recognizing the touch operation and controlling the information processing apparatus in accordance with the recognized touch operation and the position of the pointing device detected by the sensor unit, wherein the sensor unit includes at least four sensors each disposed at a position corresponding to a different quadrant or corner of the screen and each of the at least four sensor means is inclined at a non-zero angle with respect to the screen, the method further including recognizing, with the sensor unit, a direction of movement of the pointing device when the pointing device is not in contact with the screen which includes at least recognizing a circular movement of the pointing device along a plane that is parallel with respect to the screen when the pointing device is not in contact with the screen.

16. An information processing apparatus comprising:

a display device;

a pointed position detecting unit configured to detect a specified position by a touch operation of a pointing device on a screen of the display device;

a sensor unit configured to detect a position of the pointing device when the pointing device is not in contact with the screen of the display device; and a control unit configured to recognize the touch operation detected by the pointed position detecting unit and control the information processing apparatus in accordance with the recognized touch operation and the position of the pointing device detected by the sensor unit, wherein the sensor unit includes at least four sensors each disposed at a position corresponding to a different quadrant or corner of the screen and each of the at least four sensor means is inclined at a non-zero angle with respect to the screen, and the sensor unit recognizes a direction of movement of the pointing device when the pointing device is not in contact with the screen which includes at least recognizing a circular movement of the pointing device along a plane that is parallel with respect to the screen when the pointing device is not in contact with the screen.

* * * * *